United States Patent
Seed et al.

(10) Patent No.: US 11,451,633 B2
(45) Date of Patent: Sep. 20, 2022

(54) METHODS, SYSTEMS AND APPARATUSES FOR APPLICATION SERVICE LAYER (ASL) INTER-NETWORKING

(71) Applicant: IOT Holdings, Inc., Wilmington, DE (US)

(72) Inventors: Dale N. Seed, Allentown, PA (US); Michael F. Starsinic, Newtown, PA (US); Chonggang Wang, Princeton, NJ (US); Guang Lu, Thornhill (CA); Paul L. Russell, Jr., Pennington, NJ (US)

(73) Assignee: IOT Holdings, Inc., Wilmington, DE (US)

( * ) Notice: Subject to any disclaimer, the term of this patent is extended or adjusted under 35 U.S.C. 154(b) by 0 days.

(21) Appl. No.: 16/744,676

(22) Filed: Jan. 16, 2020

(65) Prior Publication Data
US 2020/0228607 A1    Jul. 16, 2020

Related U.S. Application Data

(63) Continuation of application No. 16/160,646, filed on Oct. 15, 2018, now Pat. No. 10,542,098, which is a
(Continued)

(51) Int. Cl.
*H04L 67/141* (2022.01)
*H04W 4/70* (2018.01)
(Continued)

(52) U.S. Cl.
CPC ........ *H04L 67/141* (2013.01); *H04L 41/0213* (2013.01); *H04L 47/825* (2013.01);
(Continued)

(58) Field of Classification Search
CPC ........... H04L 41/0213; H04L 29/08072; H04L 29/06; H04L 41/12
(Continued)

(56) References Cited

U.S. PATENT DOCUMENTS 7,437,509 B2    10/2008   Vayssiere
7,996,465 B2 *   8/2011   Cromp .................. G06Q 10/06
                                                    455/404.1
(Continued)

OTHER PUBLICATIONS

European Telecommunications Standards Institute (ETSI), TR 102 966 V0.1.1, "Machine to Machine Communications (M2M), Interworking Between the M2M Architecture and M2M Area Network Technologies," Sep. 2011, pp. 1-19.
(Continued)

*Primary Examiner* — Tauqir Hussain
(74) *Attorney, Agent, or Firm* — Volpe Koenig

(57) ABSTRACT

A machine-to-machine (M2M) node is configured to provide a communication management function to facilitate communication between a first service layer in a first network and a second service layer in a second network. The M2M node is configured to store a plurality of attributes for use by the communication management function and to receive via the first network, a first message from a first application in the first service layer. The M2M node is configured to determine, based on at least a first attribute identifying an expiration time after which the communication management function does not facilitate communication, that the communication management function is available to process the first message. The M2M node is configured to determine, based on at least a second attribute defining an access control list identifying applications in the first service layer, that the communication management function is available to process the first message.

10 Claims, 25 Drawing Sheets

Related U.S. Application Data continuation of application No. 14/954,948, filed on Nov. 30, 2015, now Pat. No. 10,104,180, which is a continuation of application No. 13/658,971, filed on Oct. 24, 2012, now Pat. No. 9,232,342.

(60) Provisional application No. 61/641,059, filed on May 1, 2012, provisional application No. 61/550,918, filed on Oct. 24, 2011.

(51) Int. Cl.
*H04L 41/0213* (2022.01)
*H04L 47/70* (2022.01)
*H04L 67/1095* (2022.01)
*H04L 69/08* (2022.01)

(52) U.S. Cl.
CPC .......... *H04L 67/1095* (2013.01); *H04L 69/08* (2013.01); *H04W 4/70* (2018.02)

(58) Field of Classification Search
USPC .......................................................... 709/227
See application file for complete search history.

(56) References Cited

U.S. PATENT DOCUMENTS

| | | | |
|---|---|---|---|
| 8,359,271 B2 | 1/2013 | Peckover | |
| 8,553,602 B2* | 10/2013 | Hargrave | H04L 12/66 370/311 |
| 9,235,442 B2* | 1/2016 | Kampas | H04L 67/10 |
| 2002/0069278 A1 | 6/2002 | Forslow | |
| 2003/0018769 A1* | 1/2003 | Foulger | G06Q 30/02 709/223 |
| 2003/0140112 A1 | 7/2003 | Ramachandran et al. | |
| 2005/0204054 A1* | 9/2005 | Wang | G06F 9/5011 709/232 |
| 2006/0069715 A1 | 3/2006 | Vayssiere | |
| 2006/0146991 A1 | 7/2006 | Thompson et al. | |
| 2006/0211404 A1* | 9/2006 | Cromp | G06Q 10/06 455/405 |
| 2006/0232287 A1 | 10/2006 | Sterner et al. | |
| 2008/0153521 A1* | 6/2008 | Benaouda | G01D 4/004 455/466 |
| 2008/0270548 A1* | 10/2008 | Glickstein | G06Q 10/107 709/206 |
| 2009/0092108 A1* | 4/2009 | Hargrave | H04L 12/66 370/338 |
| 2009/0144442 A1* | 6/2009 | Zheng | H04W 48/16 709/236 |
| 2009/0210574 A1* | 8/2009 | Fleming | G06F 11/0757 710/19 |
| 2009/0276771 A1* | 11/2009 | Nickolov | H04L 67/1014 717/177 |
| 2011/0047219 A1 | 2/2011 | Tripathi et al. | |
| 2011/0128911 A1* | 6/2011 | Shaheen | H04W 72/02 370/328 |
| 2011/0213871 A1* | 9/2011 | DiGirolamo | H04W 4/00 709/223 |
| 2011/0314470 A1* | 12/2011 | Elyashev | G06F 11/1484 718/1 |
| 2012/0047551 A1* | 2/2012 | Pattar | H04W 4/00 726/1 |
| 2012/0059882 A1 | 3/2012 | Stark et al. | |
| 2013/0188515 A1 | 7/2013 | Pinheiro et al. | |
| 2013/0262576 A1* | 10/2013 | Foti | H04W 4/005 709/204 |
| 2013/0329653 A1 | 12/2013 | Russell et al. | |
| 2013/0336222 A1* | 12/2013 | Lu | H04W 72/00 370/328 |

OTHER PUBLICATIONS

European Telecommunications Standards Institute (ETSI), TS 102 689 V0.4.1, Machine to Machine Communications (M2M), M2M Service Requirements, 2009, pp. 1-32.
European Telecommunications Standards Institute (ETSI), TS 102 690 V0.1.3, "Machine to Machine Communications (M2M), Functional Architecture," Feb. 2010, pp. 1-53.
European Telecommunications Standards Institute (ETSI), TS 102 690 V0.13.8, "Machine to Machine Communications (M2M), Functional Architecture," Aug. 2011, pp. 1-283.
European Telecommunications Standards Institute (ETSI), TS 102 921 V0.7.3, "Machine to Machine Communications (M2M), Mla, Dla, and Mld Interfaces," Jul. 2011, pp. 1-216.
Fielding et al., "Hypertext Transfer Protocol (HTTP 1.1)," RFC 2616, Jun. 1999, pp. 1-165.
Fielding, "Architectural Styles and the Design of Network-Based Software Architectures," University of California, Irvine, 2000, pp. 1-180.
Shelby et al., "Constrained Application Protocol (CoAP)," draft-ietf-core-coap-07, the Internet Engineering Task Force (IETF), Jul. 8, 2011, pp. 1-86.
Zigbee Alliance, "Zigbee Smart Energy Profile 2.0 Public Application Protocol Specification," ZigBee-11167, Mar. 17, 2011, pp. 1-204.

* cited by examiner

METHODS, SYSTEMS AND APPARATUSES FOR APPLICATION SERVICE LAYER (ASL) INTER-NETWORKING

CROSS REFERENCE TO RELATED APPLICATIONS

This application is a continuation of U.S. patent application Ser. No. 16/160,646, filed Oct. 15, 2018, which is a continuation of U.S. patent application Ser. No. 14/954,948, filed Nov. 30, 2015 which issued as U.S. Pat. No. 10,104,180 on Oct. 16, 2018, which is a continuation of U.S. patent application Ser. No. 13/658,971, filed Oct. 24, 2012, which issued as U.S. Pat. No. 9,232,342 on Jan. 5, 2016, which claims the benefit of U.S. Provisional Patent Application No. 61/550,918 filed Oct. 24, 2011 and U.S. Provisional Patent Application No. 61/641,059 filed May 1, 2012, the contents of which are hereby incorporated by reference herein.

BACKGROUND

Today, many network technologies use Application Service Layers (ASLs) to simplify or facilitate communications between applications, devices, and the like. Such ASLs may include a collection of functions that may be implemented in a reusable and/or modular manner as a support layer for applications and/or devices. For such ASLs to be successfully adopted and mass deployed, efficient methods of inter-networking ASLs of different networking technologies with one another may need to be provided or used. Such inter-networking may be important to support end-to-end communication between applications communicating with one another across inter-connected networks having different ASLs. For these types of use cases, challenges can arise since attributes of one ASL (e.g. interfaces, types of services, and the like) may differ from those defined by another ASL. For example, the ZigBee Smart Energy 2.0 resource structure may differ greatly from the European Telecommunications Standards Institute (ETSI) machine to machine (M2M) resource structure. To complicate matters further, in many situations networks may already be deployed, and updating the ASLs in these networks to add support for interfacing to the ASLs of other network technologies may not be feasible due to technical, business, and/or accessibility limitations.

SUMMARY

Systems and/or methods disclosed herein may define a minimally intrusive and highly transparent mechanism for interfacing the application service layers (ASLs) of multiple different networking technologies with one another. The methods, systems and apparatuses disclosed herein may further define an intelligent tunneling mechanism used to interface different ASLs with one another, and in turn, allow applications to communicate with one another in an end-to-end fashion across inter-connected networks having different ASLs. In one embodiment, this intelligent ASL tunneling mechanism may support encapsulating the ASL messages of one networking technology within the ASL messages of another networking technology to allow the messages to flow in an end-to-end fashion across the inter-connected ASLs. In doing so, applications may, not only communicate with one another in an end-to-end fashion but also make use of the application layer services supported by the ASLs of remote networks along with the services supported by their own local network's ASL. In one or more embodiments, a method may include establishing, at a gateway, a tunnel anchor point (TAP) for performing tunneling operations to facilitate internetworking among ASLs of different network technologies. Additionally, in an embodiment, the TAP may be configured to mirror content.

For example, in an embodiment, systems and/or methods for providing internetworking among application services layers (ASLs) of different network technologies may be provided. For example, a tunnel anchor point (TAP) may be established (e.g. within an application services layer (ASL) associated with a network). The TAP may be configured to enable communication between a local application in the network and a remote application in a different network. At the TAP, an ASL tunnel may be created to the local application in the network to facilitate the communication. Additionally (e.g. at the TAP via the ASL tunnel), a message from the local application may be received where at least a portion of the message may be configured to be provided to a remote ASL and the remote application in the different network to which the local application wishes to communicate. Via the TAP, at least a portion of the message may be provided to the remote ASL and the remote application in the different network to facilitate the communication between the local application in the network and the remote application in the different network.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

Figure 1:
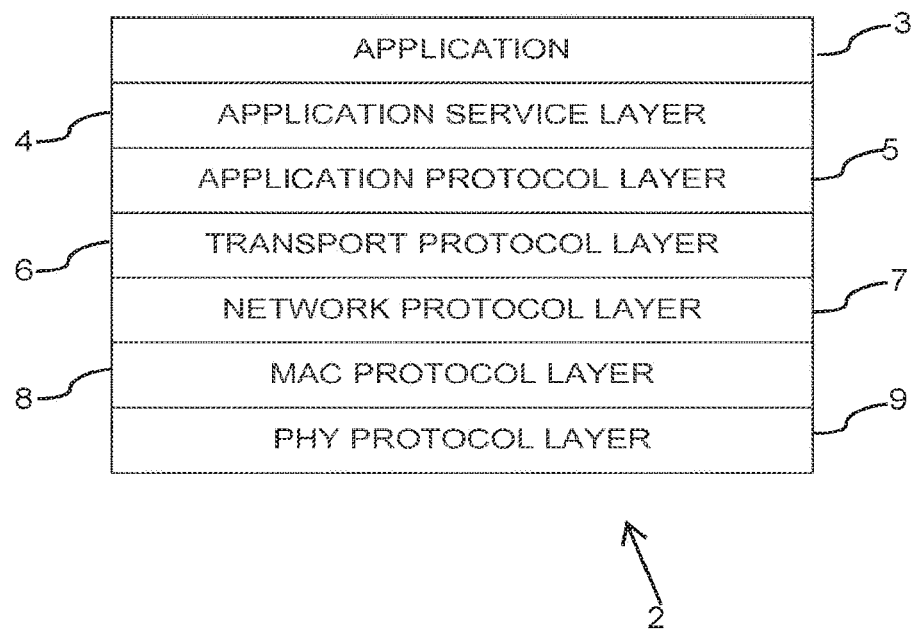
FIG. 1 is a block diagram illustrating a typical networking protocol stack with an application service layer (ASL).

A detailed description of illustrative embodiments may now be described with reference to the various Figures. Although this description provides a detailed example of possible implementations, it should be noted that the details are intended to be exemplary and in no way limit the scope of the application.

Embodiments disclosed herein may provide and/or define a generic, minimally intrusive, and/or transparent (e.g. highly transparent) systems and/or methods for interfacing application service layers (ASLs) of different networking technologies with one another (e.g. without using an overly complex gateway or proxy functionality that may be costly and difficult to manage). According to an example embodiment such systems and/or methods may provide an Application Service Layer Intelligent Tunneling Mechanism that may enable interfacing various ASLs as described herein. Additionally, in an embodiment, an ETSI M2M Application Service Layer may be inter-networked with a ZigBee IP SE 2.0 Application Service Layer.

For example, such systems and/or methods may provide support for efficient interworking of application service layers of different networking technologies that may be RESTful in nature. Using these systems and/or methods (e.g. mechanisms), efficient end-to-end RESTful communication between endpoint applications residing in different application service layer domains may be realized without the use of complex gateway logic having to perform application layer protocol translations and message manipulation as described herein.

Additionally, such systems and/or methods described herein may provide intelligent tunneling (e.g. re-targeting) for such RESTful interworking of application service layers (ASLs) of different networking technologies. In an embodiment such a tunneling may be implemented as interworking services within an application service layer. Additionally, the intelligent application service layer tunnels may be responsible for re-targeting and delivery of messages from one application service layer to another and ultimately from one application to another. This may be performed or done in a RESTful manner. In addition to re-targeting and delivery, these intelligent communication tunnels may also support one or more of the following (e.g. as described herein and in more detail below): filtering messages based on type, origin or destination of the message (e.g. where origin or destination can be terms of resource, application or device); network based buffering, caching and aggregation of messages; mirroring of content from an application into the ASL and making it available to other ASLs and applications; discovery of applications and services supported by an ASL; and the like.

According to an embodiment, such systems and/or methods may support the interworking of ETSI M2M services to other RESTful local/personal area networking technologies (e.g. ZigBee SE 2.0, 6LoWPAN/CoAP, and the like) and/or may defines how these interworking systems and/or methods (e.g. mechanisms) may be integrated into the ETSI M2M defined service layer.

An Application Service Layer (ASL) may provide a support layer for applications in which a collection of functions may be implemented in a re-usable and modular fashion. For example, ASLs may support Application Programming Interfaces (APIs) that may provide applications access to a collection or library of application layer functions as well as access to functions and/or services that may reside in lower protocol layers.

Examples of the types of functionality supported by an ASL may include services, such as, for example, application bootstrapping, registration, discovery, management and general transmission and reception of application messages. These ASL services may be made available to applications via APIs that may make use of defined message formats, resource structures, resource representations, and the like. FIG. 1 depicts a block diagram illustrating an example embodiment of a typical networking protocol stack with an ASL that may be provided and/or used. As shown in FIG. 1, an ASL 4 may reside in between an application layer 3 and an application protocol layer 5 of a networking protocol stack 2. Additional layers such as a transport protocol layer 6, a network protocol layer 7, a MAC protocol layer 8, a PHY protocol layer 9, and the like may also be included in the networking protocol stack 2 as shown in FIG. 1.

Additionally, a growing trend in communication network technologies may be the use of the Application Service Layer (ASL) and the standardization thereof By using (e.g. and standardizing) the ASL for a particular networking technology, many of the same benefits that may have been realized by standardizing lower level protocol layers (e.g. layers below the ASL (e.g. 4) such as the application protocol layer (e.g. 5), the transport protocol layer (e.g. 6), the network protocol layer (e.g. 7), the MAC protocol layer (e.g. 8), the PHY protocol layer (e.g. 9), and the like) may also be realized for the ASL.

Figure 2:
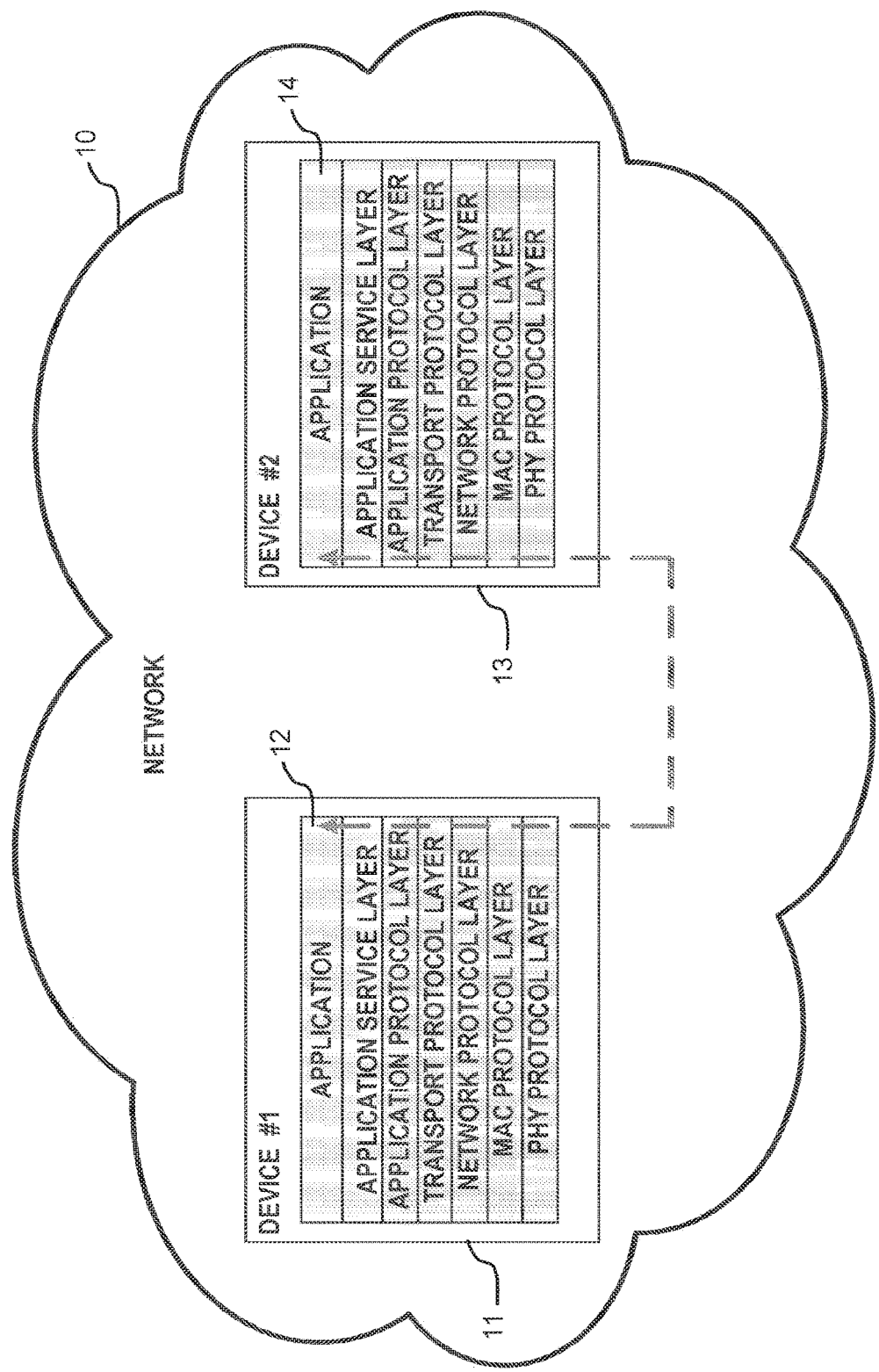
FIG. 2 is a block diagram illustrating two applications communicating with one another via a common ASL.

According to an example embodiment, via an ASL (e.g. a standardized ASL), applications that may be compliant with the same ASL may have a higher probability of interoperating with one another in a more reliable manner. FIG. 2 depicts a block diagram illustrating an example embodiment of two applications communicating with one another via a common ASL (e.g. in a common or similar networking technology). As shown in FIG. 2, in a network 10, an application 12 on a first device 11 may communicate (e.g. at 15) with another application 14 on a second device 13 via a common ASL.

In an embodiment, an extension of using or standardizing ASLs for one particular networking technology may be or may include defining systems and/or methods to enable inter-networking ASLs of different networking technologies to interface or work with one another as described herein. By inter-networking the ASLs of different networking technologies with one another as described herein, the services of each ASL may be made available to applications to facilitate end-to-end communication between the applications residing in different networks that may use different ASLs.

Figure 3:
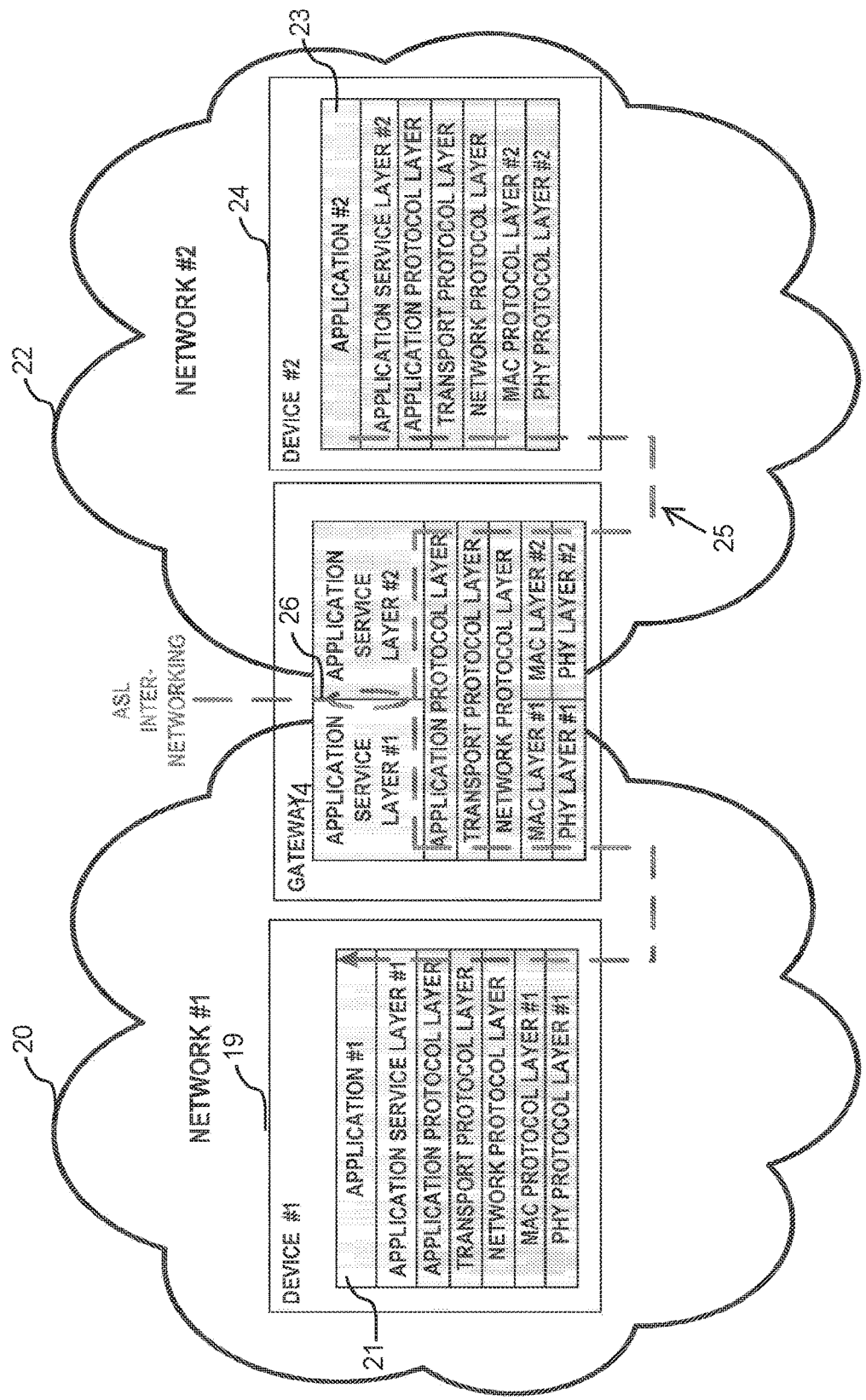
FIG. 3 is a block diagram illustrating inter-networking of ASLs between two different networking technologies.

FIG. 3 depicts a block diagram illustrating an example embodiment of inter-networking of ASLs between two different networking technologies (e.g. technologies of the first network 20 and the second network 22 respectively). For example, as shown in FIG. 3, in an embodiment, an application (e.g. 23) on a second device (e.g. 24) in the second network (e.g. 22) or network #2 may initiate communication (e.g. at 25) with an application (e.g. 21) on a first device (e.g. 19) in the first network (e.g. 20) or network #1 via an ASL inter-networking component (e.g. 26) that may be or may act an intermediary between the first and second devices (e.g. 19 and 24) and the different network technologies or networks (e.g. 20 and 22) to enable such a communication (e.g. at 25).

Additionally, in an embodiment, one or more of the ASLs may be or may be made RESTful (e.g. due to the explosion of Internet-based applications and cloud-based computing). REST (Representational State Transfer) may include a software architecture style (e.g. for distributed systems such as the world wide web (WWW) or Internet) that may rely on a client-server based model. For example, clients may make requests to resources that may be hosted on servers. A resource may be addressed via a Uniform Resource Identifier (URI). Clients may use a simple and uniform set of commands to make requests to resources. These commands may be (e.g. may often be) referred to as "CRUD" operations—Create (POST), Retrieve (GET), Update (PUT) and Delete). In an embodiment, the RESTful ASLs may include one of the many web based ASLs being deployed on the modern web or Internet that may be layered on top of a protocol such as a RESTful hypertext transfer protocol (HTTP) protocol.

Figure 4:
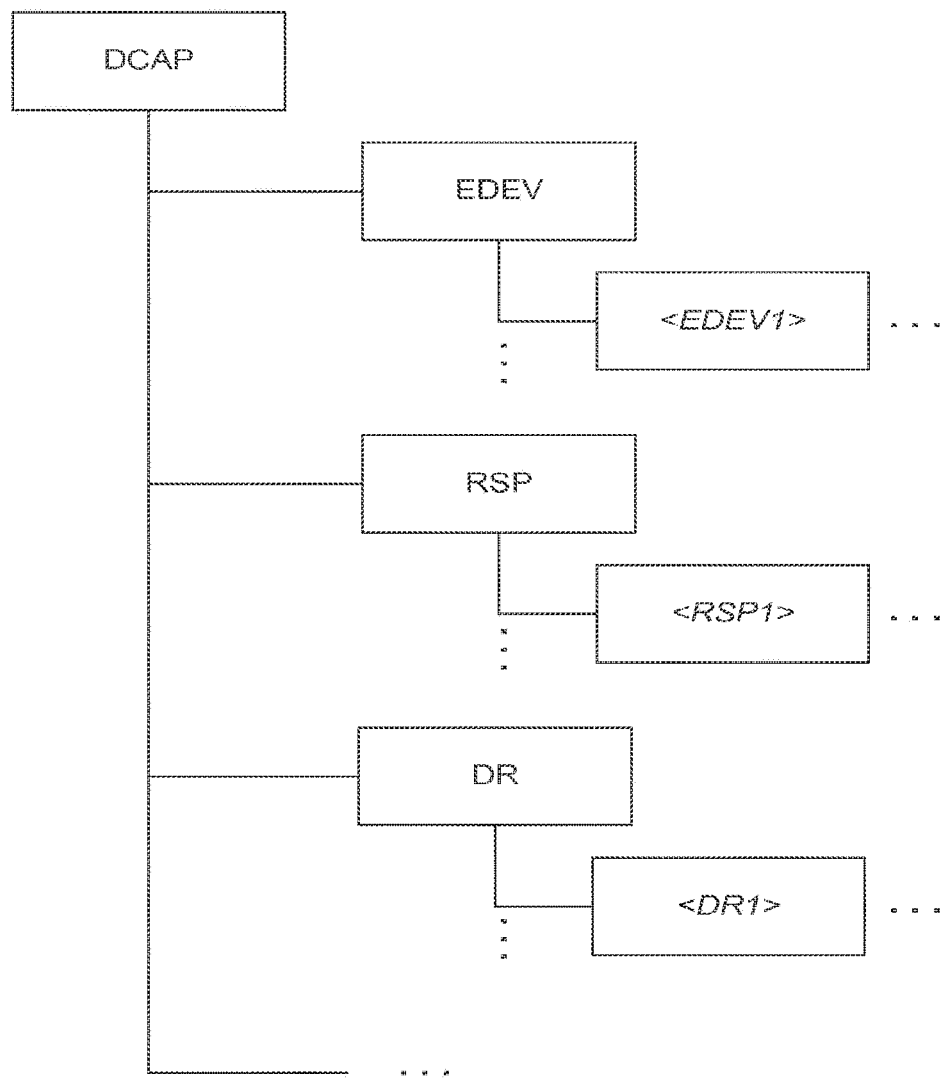
FIG. 4 is a block diagram illustrating an ASL defining a standard RESTful resource structure along with a format of each resource representation in the structure.
Figure 6:
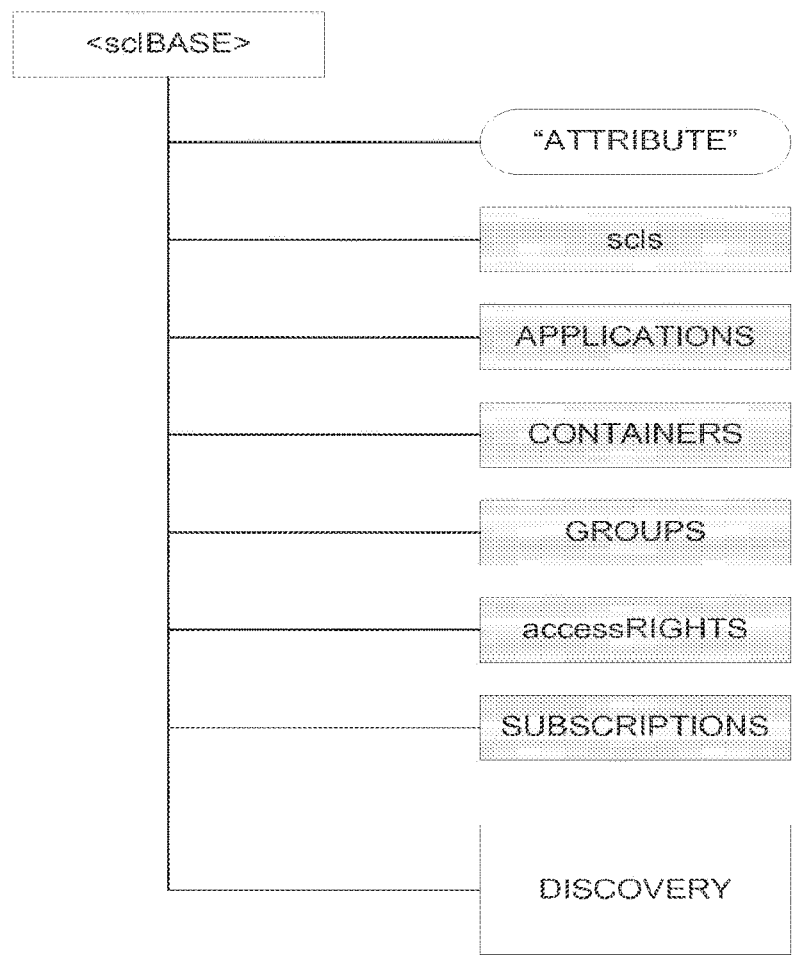
FIG. 6 is a block diagram illustrating an example M2M ASL and its RESTful resource structure in accordance with one or more embodiments.

According to an embodiment, the RESTful ASLs may include the Zigbee IP Smart Energy 2.0 ASL, the ETSI M2M ASL, and the like as described herein. Additionally, the RESTful ASLs such as the Zigbee IP Smart Energy 2.0 ASL, the ETSI M2M ASL, and the like (e.g. described herein) may be similar (e.g. may have one or more things in common) may be similar (e.g. may have one or more things in common). For example, each of the RESTful ASLs may define a hierarchical resource tree structure which may form the interface to the ASL as shown in FIGS. 4 and 6. According to an embodiment, although RESTful ASLs may reduce the complexity of interfacing ASLs of different networking technologies, the RESTful ASLs (e.g. in general) may not provide seamless end-to-end interconnection and/or communication across different ASLs (e.g. in different networks or network technologies). As such, systems and/or methods such as those described herein may be provide and/or used to accommodate such different ASLs.

As described above, an ASL that may be provided and/or used may be the Zigbee IP Smart Energy 2.0 ASL. For example, the ZigBee Smart Energy 2.0 may unify the mix of communication technologies present in a local area network (LAN) of energy monitoring and control type devices with a common internet protocol (IP) stack and may include a RESTful ASL. The ZigBee Smart Energy 2.0 ASL may be implemented and/or targeted for implementation on ZigBee, HomePlug, Wi-Fi, Ethernet, and other IP-capable platforms according to an example. The ASL may define or provide methods, mechanisms, and/or techniques for exchanging application messages including error messages and/or security features that may be used to protect the application messages. The ASL may also define and/or provide a standard RESTful resource structure (e.g. as shown in FIG. 4) as well as the format of each resource representation in such a structure.

As described above, an ASL that may be provided and/or used may be an ASL associated with an ETSI M2M. For example, the ETSI M2M may define a service layer specifically targeted to provide services to M2M applications. These applications may be typically hosted on M2M devices residing in M2M local/personal area networks (e.g. ZigBee, 6LoWPAN, Bluetooth, and the like) and may interface to peer applications connected to M2M servers in the backend network. Additionally, the ETSI M2M may define or provide a RESTful ASL that may be tailored for enabling communication between applications that may either be hosted or interfaced to M2M devices, gateways, servers, and the like. The ASL may facilitate communication between applications both locally (e.g. a device application communicating with a gateway application over a LAN or PAN) as well as remotely (e.g. a device application communicating with a network application over WAN). Additionally, the ETSI M2M service layer architecture (e.g. ASL) may be a resource oriented RESTful architecture that may leverage the concepts and features of web-based services. According to one embodiment, the ASL in ETSI M2M may be a Service Capability Layer (SCL).

Figure 5:
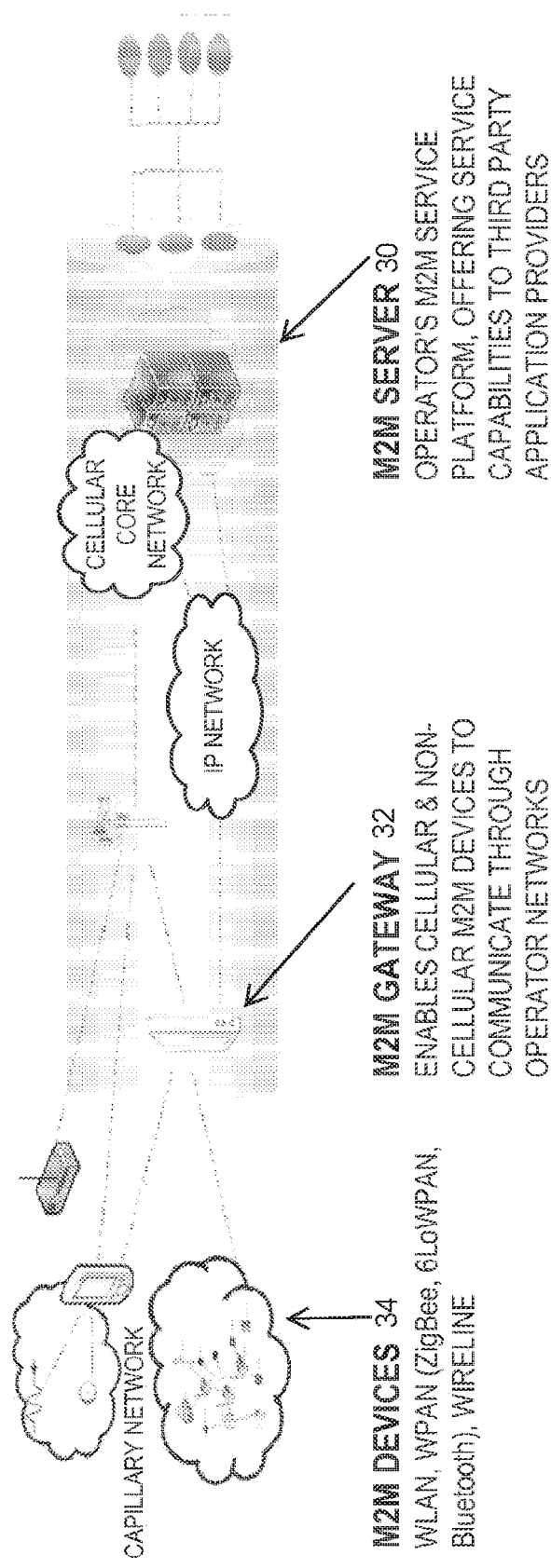
FIG. 5 is a block diagram illustrating a general ETSI M2M system architecture in accordance with one or more embodiments.

FIG. 5 depicts a block diagram illustrating an example embodiment of a ETSI M2M system architecture that may include one or more M2M servers 30 that may reside in a M2M core and/or may facilitate, use, or provide M2M service capabilities, one or more M2M gateways 32 that may facilitate, use, or provide M2M service capabilities, and/or one or more M2M devices 34 that may or may not facilitate, use, or provide M2M service capabilities. In the ETSI M2M system architecture (e.g. shown in FIG. 5), the ASL may be hosted on a M2M Server, Gateway, and/or Device. In an embodiment, one or more M2M Applications may register and interface to an ASL that may be hosted on the M2M Server, Gateway, and/or Device. The ETSI M2M ASL may provide or device one or more interfaces (e.g. mla, mld, dla), a RESTful resource structure, and/or procedures or methods that may be used by both the M2M ASL and applications for communicating with one another. In an embodiment, the M2M ASL may include a RESTful resource structure as shown in FIG. 6.

Figure 7:
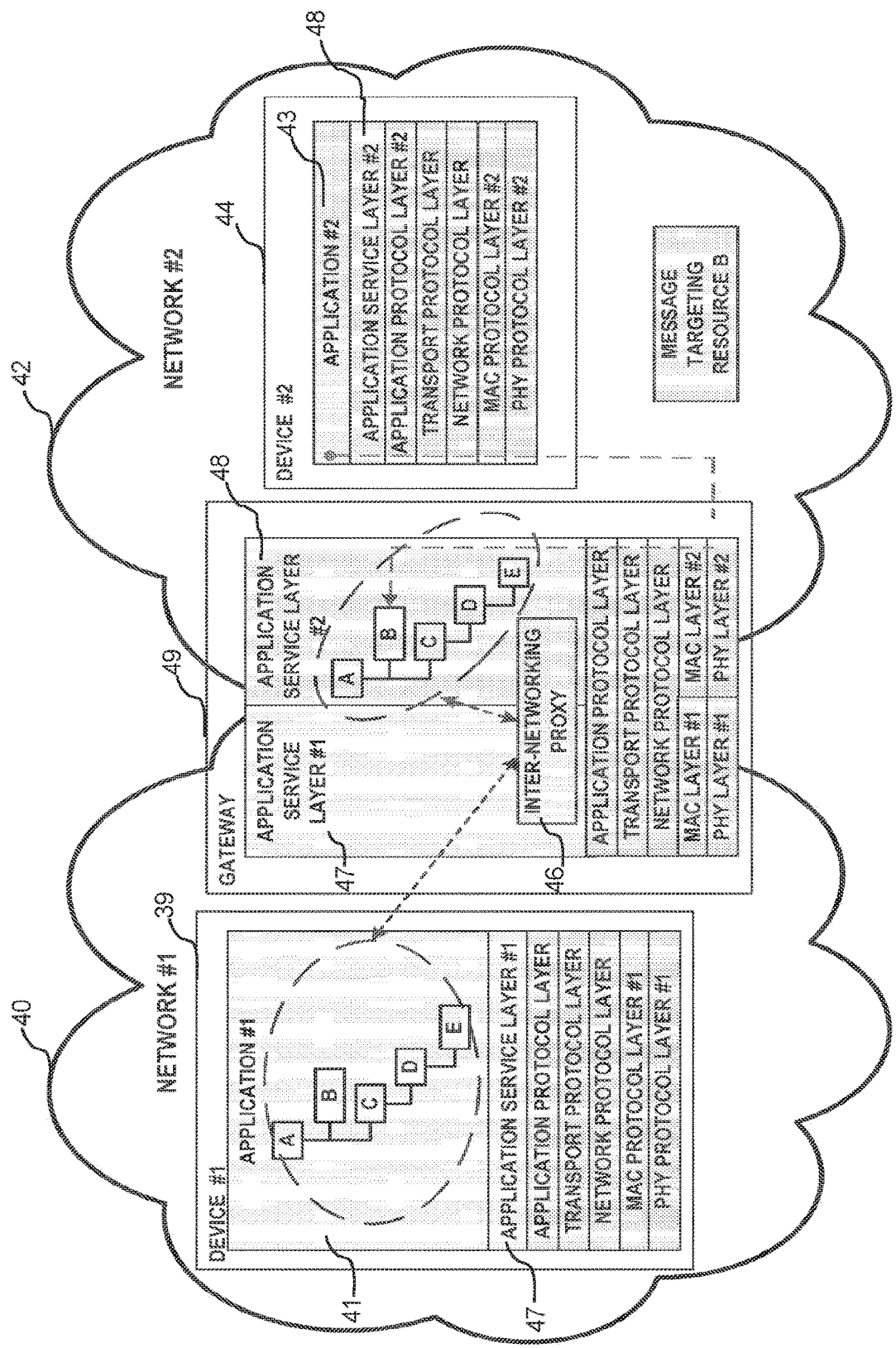
FIG. 7 is block diagram illustrating an example system architecture and a proposed method for inter-networking ASLs of different networks, using mirroring of applications/resources from one network into the ASL of the other network.

In an embodiment, a method for inter-networking ASLs of different networks (e.g. a Zigbee or ETSI ASL) may be to 'mirror' (e.g. copy) applications and/or resources from one network into the ASL of the other network, for example, shown in FIG. 7. In such a method, mirroring may be performed by an inter-networking proxy function (e.g. 46) that may have intelligence and awareness of the different networking technologies (e.g. a first network 40 or network #1 and a second network 42 or network #2) and ASLs (e.g. ASL 47 or ASL #1 and ASL 48 or ASL #2 that may be included in a gateway (e.g. 49) and/or the devices (e.g. 39 and/or 44)) that may be inter-networked. According to an embodiment, such a mirroring method or technique, however, may be overly complex since the inter-networking proxy may perform one or more of the following types of complex operations: may discover each device as it joins a network such as the first network (e.g. 40) or network #1 and then may discover each application (e.g. 41 and/or 43) as well as each resource hosted on each device (e.g. a first device 39 or device #1 and/or a second device 44 or device #2); may create mirror resources for each device, application, and/or resource residing in a network such as the first network 40 or network #1 within the ASL resource structure (e.g. that may be included in the ASL of the other network such as the second ASL 48 or ASL #2 in the device or the gateway thereof) of another network such as the second network 42 or network #2; may interface with the ASLs (e.g. the first ASL 47 or ASL #1 and the second ASL 48 or ASL #2) of networks, for example, both the first network 40 or network #1 and the second network 42 or network #2 to proxy requests and/or responses back and forth between the mirrored resources in a ASL (e.g. the second ASL 48 or ASL #2) and the corresponding entities in a network such as the first network 40 or network #1 and vice versa; (iv) may update mirror resources in an ASL such as the second ASL 48 or ASL #2 when triggered to do so from devices (e.g. the first device 39 or device #1) and/or applications (e.g. application 41 or application #1) that may reside in a network such as the first network 40 or network #1; (v) may forward updates to an ASL such as the second ASL 48 or ASL #2 to mirror resources to devices (e.g. the first device 39 or device #1) and/or applications (e.g. the application 41 or application #1) that may reside in a network such as the first network 40 or network #1; and/or (vi) may detect when devices (e.g. the first device 39 or device #1) may leave a network such as the first network 40 or network #1 or when applications on devices (e.g. the first device 39 or device #1) in a network such as network #1 may be terminated and may delete corresponding resources in an ASL such as the second ASL 48 or ASL #2 accordingly. As a result of such complexity, the mirroring technique, mechanism, and/or method may have one or more problems.

In an embodiment, the mirroring mechanism or method may lack scalability. For example, for each new device that may join a network such as network #1 (e.g. 40), the inter-networking proxy (e.g. 46) may discover it and its applications and resources, and may then mirror them by creating corresponding resources in an ASL such as the second ASL 48 or ASL #2. Subsequently, communication between the ASL such as the second ASL 48 or ASL #2 and the network such as the first network 40 or network #1 and its devices (e.g. the first device 39 or device #1) and/or applications (e.g. the application 41 or application #1) may flow through the inter-working proxy (e.g. 46). Second, the mirroring mechanism may be highly complex. For example, the inter-networking proxy (e.g. 46) may become overly complex since it may be responsible for discovery and detection of devices (e.g. the first device 39 or device #1) joining and leaving a network such as the first network 40 or network #1. The inter-networking proxy (e.g. 46) may also be responsible for creation, updating, and/or servicing of mirrored resources in an ASL such as the second ASL 48 or ASL #2. Additionally, the inter-networking proxy (e.g. 46) may have decreased reliability. For example, the inter-networking proxy (e.g. 46) may become a point (e.g. a single) of failure since communication between an ASL such as the second ASL 48 or ASL #2 and a network such as the first network 40 or the network #1 and its devices (e.g. the first device 39 or device #1) and/or applications (e.g. the application 41 or application #1) may flow through the inter-networking proxy (e.g. 46). Furthermore, the inter-networking proxy (e.g. 46) may lack end-to-end communications. For example, since communications may be proxied by the inter-networking function (e.g. 46), end-to-end communication between applications (e.g. the application 41 or application #1 and the second application 43 or application #2) residing in a network such as the first network 40 or network #1 and another network such as the second network 42 or network #2 may not be possible.

One or more embodiments disclosed herein may define a generic, minimally intrusive and/or transparent (e.g. highly transparent) technique, mechanism, or method for interfacing one or more ASLs of multiple (e.g. two) different networking technologies (e.g. different networks) with one another. Also, one or more embodiments disclosed herein may define an intelligent tunneling technique, mechanism, or method that may be used to interface different ASLs with one another, and in turn, may allow or enable applications to communicate with one another in an end-to-end fashion across inter-connected networks that may have different ASLs.

Such an intelligent ASL tunneling mechanism or method that may be provided herein may support encapsulating one or more ASL messages of a networking technology or network within one or more ASL messages of another networking technology or network to allow or enable the messages to flow in an end-to-end fashion across the inter-connected ASLs. In such an embodiment (e.g. by doing so), applications may communicate with one another in an end-to-end fashion or manner and may also make use of application layer services that may be supported by the ASLs of remote networks along with the services supported by their own local network's ASL. The ASL tunneling technique, mechanism, or method disclosed herein may mirror content (e.g. if desired) in an embodiment. Such a mirroring may be performed (e.g. in an opportunistic manner) by the ASL tunneling technique, mechanism, or method as it may tunnel requests and/or responses such that the burden of mirroring may be offloaded from inter-networking proxies and/or local and remote applications.

Embodiments (e.g. the systems, techniques, mechanisms, or methods for providing an ASL tunnel or ASL tunneling mechanism or component for enabling inter-networking of ASLs in different network technologies) disclosed herein may be simpler when compared to conventional mechanisms. For example, once an ASL tunnel or ASL tunnel mechanism or component may be setup, messaging between applications may flow in an end-to-end fashion without complex mirroring or proxying of messages between the applications hosted in different networks. Additionally, no inter-networking proxying of messages may be used (e.g. may be required).

The embodiments (e.g. the systems, techniques, mechanisms, or methods for providing an ASL tunnel or ASL tunneling mechanism or component for enabling inter-networking of ASLs in different network technologies) disclosed herein may also be scalable. For example, compared to the mirroring technique, mechanism, or method described above, the ASL tunnel or ASL tunneling mechanism or component may be scalable since as few as a single resource may be used for inter-networking an application and its resources from a networking technology or network to another networking technology or network. According to an embodiment, using the mirroring technique, mechanism, or method, separate resources may be used for each application resource.

Additionally, embodiments (e.g. the systems, techniques, mechanisms, or methods for providing an ASL tunnel or ASL tunneling mechanism or component for enabling inter-networking of ASLs in different network technologies) disclosed herein may be reliable. For example, a complex proxy may not be used to inter-network ASLs with one another, and, as such, a point (e.g. a single point) of failure may be avoided.

Moreover, embodiments (e e.g. the systems, techniques, mechanisms, or methods for providing an ASL tunnel or ASL tunneling mechanism or component for enabling inter-networking of ASLs in different network technologies) disclosed herein may provide for end-to-end communication between applications residing in different networks. For example, the applications may also be able to access services that may be supported by ASLs in other networks (e.g. an application may use discovery services of remote ASLs to find resources in other networks).

In additional embodiments, the intelligent ASL tunnel or ASL tunneling mechanism or component may be used to inter-network an ETSI M2M ASL with ASLs of other networks such as a ZigBee IP Smart Energy 2.0 ASL, and the like (e.g. as disclosed herein).

As described above, systems, methods, techniques, or mechanisms described herein may provide or define an intelligent Application Service Layer (ASL) tunnel or tunneling mechanism or component that may be used to inter-network the ASLs of different networking technologies with one another (e.g. efficiently). By inter-networking ASLs with one another using such an ASL tunneling mechanism or component, applications that may be hosted within different networks may effectively communicate with one another in an end-to-end fashion or manner even if the applications may not be using the same ASL. In addition, applications may access services supported by the ASLs of other networks.

According to an example embodiment, the intelligent ASL tunneling mechanism or component may include an ASL Tunnel Management Function (TMF) and/or an ASL Tunnel Anchor Point (TAP). According to an example embodiment, the TMF may be establish or setup up and/or may tear-down the ASL tunnels or ASL tunneling mechanisms or components by creating and deleting TAPs. For example, the function of each TAP may be to perform actual tunneling operations or methods between a local application residing in the same network as the TAP and a remote application residing in an inter-connected network (e.g. that may be a different network). In an embodiment, the TAPs may be setup within the ASL of a network whose local applications may initiate communication with remote applications hosted in the inter-connected network. Once a TAP may be setup in an ASL, the local applications within that network may use the TAP to tunnel messages to the corresponding remote application in the inter-connected network.

Figure 8:
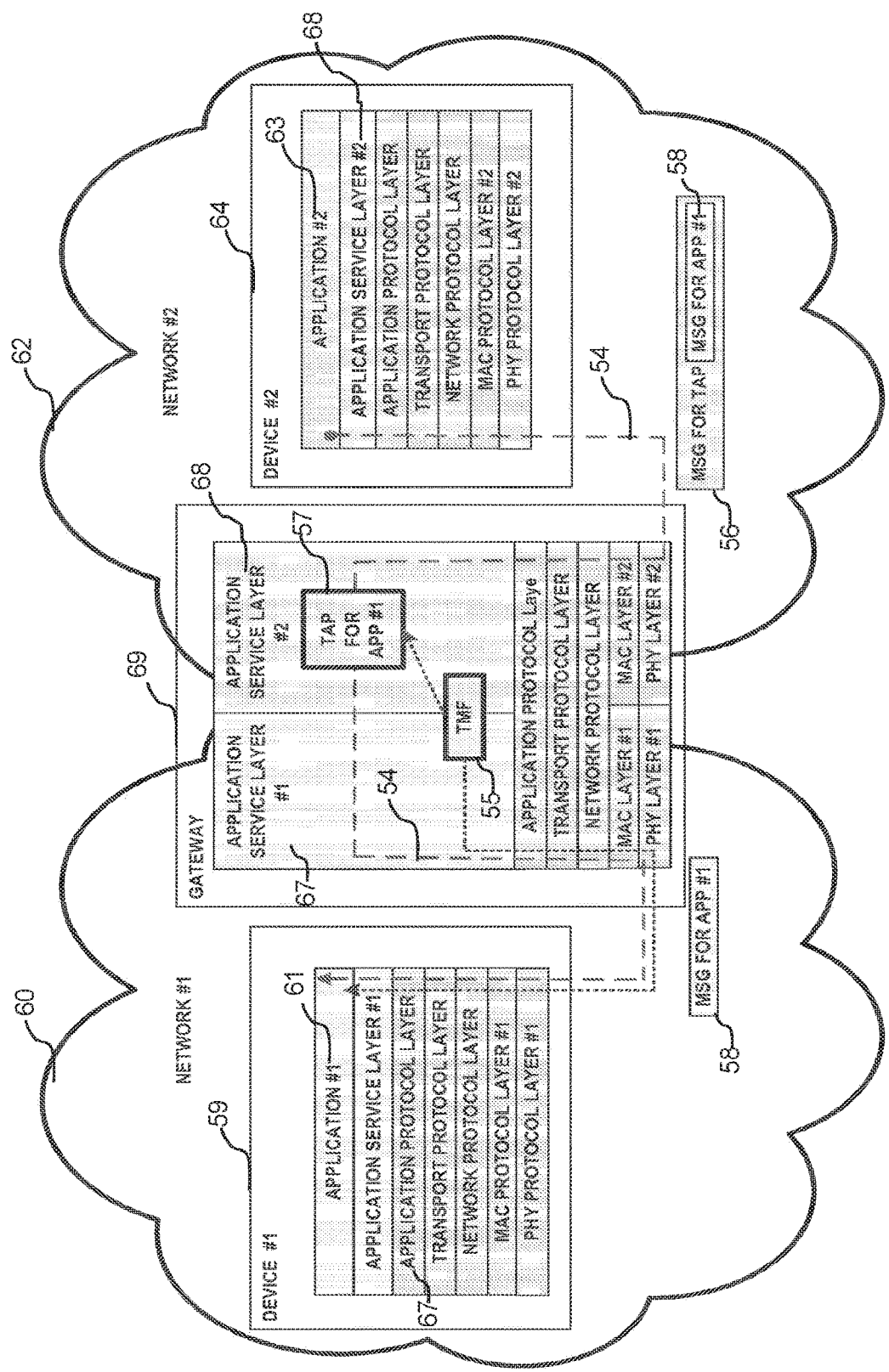
FIG. 8 is a block diagram illustrating an example of an intelligent ASL tunneling embodiment that may be provided and/or used herein.

FIG. 8 depicts a block diagram illustrating an example embodiment of an intelligent ASL tunneling mechanism or component that may be used herein. For example, as shown in FIG. 8, an application (e.g. an application 63 or application #2) in a network such as a second network 62 or network #2 may initiate communication with an application (e.g. an application 61 or application #1) in another network such as a first network 60 or network #1 using ASL tunneling (e.g. that may be provided by an ASL tunneling component or mechanism such as a TMF 55 and TAP 57).

Figure 9A:
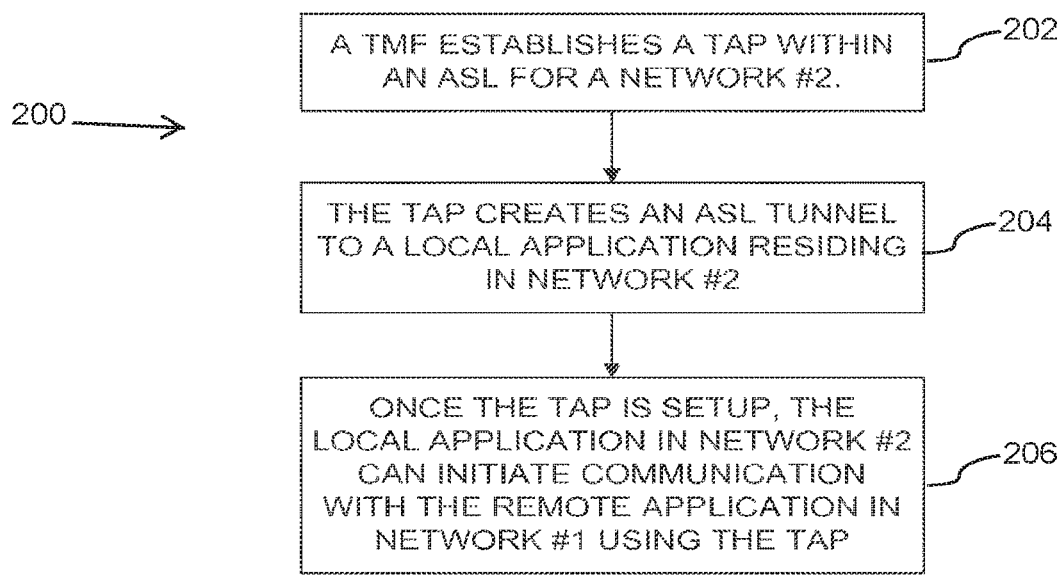
FIGS. 9A-9B are flow charts illustrating a flow the embodiment of FIG. 8.
Figure 9B:
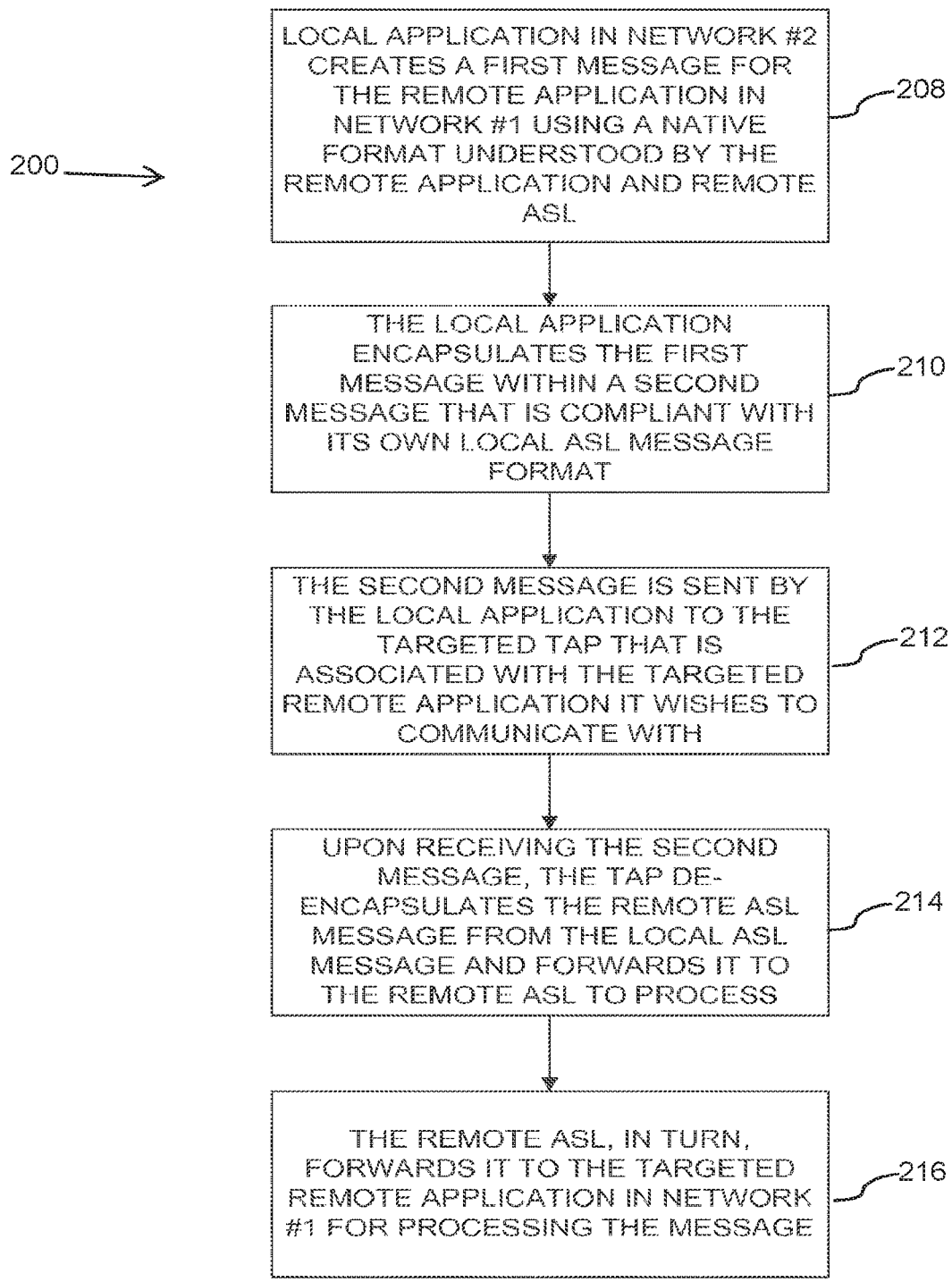

Additionally, FIGS. 9A-9B depict flow charts illustrating an example embodiment of a flow or method 200 for providing communication as shown FIG. 8 using an intelligent ASL tunneling mechanism or component. As shown in FIGS. 9A-9B (e.g. and FIG. 8), at 202, a TMF (e.g. 55) may establish a TAP (e.g. 57) within an ASL (e.g. a second ASL 68 or ASL #2) for the second network 62 or network #2 of a gateway (e.g. 69). The TAP (e.g. 57) may create, at 204, an ASL tunnel (e.g. via 54) to a local application (e.g. application 63 or application #2) residing in the second network 62 or network #2 (e.g. the ASL tunnel 54 may also be established with the application 61 or application #1 in the first network 60 or network #1 to facilitate communication between the applications 61 and 63, for example). At 206, once the TAP (e.g. 57) may be setup, the local application (e.g. the application 63 or application #2) in the second network 62 or network #2 may initiate communication with a remote application (e.g. an application 61 or application #1) in the first network 60 or network #1 using the TAP (e.g. 57 and, for example, via the ASL tunnel 54). According to an example embodiment, the local application (e.g. the application 63 or application #2) in the second network 62 or network #2 may do this (e.g. initiate communication), at 208, by creating a message (e.g. 58) for the remote application (e.g. the application 61 or application #1) in the first network 60 or network #1 using a native format that may be understood by this remote application and the remote ASL (e.g. 67). As such, the local application may include support for creating messages in this native format of the remote ASL. At 210, the local application may then encapsulate the message within another message (e.g. 56) that may be compliant with its own local ASL message format. Such a message (e.g. 58 encapsulated within 46) may then be sent by the application to the targeted TAP that may be associated with the targeted remote application (e.g. application 61 or application #1) it may wish to communicate with at 212. After receiving such a message, at 214, the TAP (e.g. 57) may de-encapsulate the remote ASL message from the local ASL message and may forward or provide the remote ASL message (e.g. 58) to the remote ASL to process. At 216, the remote ASL in turn may forward it to the targeted remote application (e.g. the application 61 or application #1) in network #1 which may process the message.

In an embodiment, if an application residing in network #1 may want to initiate communication with an application in network #2 (e.g. in a different use-case), a similar approach or method may be used. For example, a TMF may setup a TAP in the ASL of the first network 60 or network #1 for the application (e.g. the application 63 or application

2) in the second network 62 or network #2. This may enable or allow a local application (e.g. the application 61 or application #1) in the first network 60 or network #1 to use ASL tunneling to initiate communication with the remote application in network #2. Although this may not be shown in FIGS. 8 and 9A-9B, such an embodiment may be provided, for example, using the components described therein.

According to an example embodiment, a TMF (e.g. 55 shown in FIG. 8) as well as a TAP (e.g. 57 shown in FIG. 8) may also support a set of intelligent tunneling features. In such an embodiment, the features may be configured and managed by the TMF as well as other entities in the hosting ASL. The features may also be made accessible to the local applications having access to the hosting ASL. Through such features, added intelligence for the tunnel may be realized. For example, local applications may discover the type of services, protocols a remote application supports by querying corresponding attributes in the TAP that may track this information. Further description of these intelligent TMF and TAP features and attributes may be provided herein.

The ASL Tunnel Management Function (TMF) (e.g. such as 55) may include one or more features and/or capabilities as described herein. For example, the TMF may perform discovery to discover the ASLs of each respective network technology that may be inter-connected with each other. In an example embodiment, the TMF may discover the ASLs using native discovery mechanisms that may be supported by each networking technology. Alternatively, the TMF may be pre-provisioned with ASL information (e.g. APIs, interfaces, and the like), and discovery of the ASL(s) may not be performed or needed.

Additionally, the TMF may discover remote devices, applications and resources. The TMF may use native discovery services supported by the remote ASL to perform this discovery. The TMF may be pre-provisioned with information for such devices, applications, and/or resources (e.g. network addresses, and the like), and as such, discovery devices, applications and resources may not be needed.

The TMF may support creating TAPs in a local ASL. For example, in an embodiment, by default the TMF may unconditionally create a TAP for each discovered remote application. Additionally, the TMF may create TAPs based on certain criteria. For example, the TMF may support a set of configurable attribute(s) to qualify creation of a TAP. Example of such attributes include creating a TAP if the remote device, application, and/or resource may be of a specified type; creating a TAP if the remote device, application, and/or resource may match a specified identifier/address; creating a TAP if the remote device, application, and/or resource may be hosted in a network of a specified type; creating a TAP if the remote device, application, and/or resource may be hosted in a network matching a specified identifier/address; and the like.

According to an embodiment, the TMF may further support configuring and/or managing attributes within a TAP. For example, the TMF may support, for example, configuration of access control list (e.g. Access Control); enabling and/or disabling buffering of requests; enabling and/or disabling caching of responses; enabling and/or disabling concatenation of requests; configuration of TAP filters, enabling and/or disabling mirroring content that may be included in requests and/or responses, and the like. The TMF may also support deleting of TAPs when they are no longer needed (e.g. when devices leave the network or when applications or resources are terminated).

Table 1 illustrates a list of example TMF attributes that may be provided and/or used as described herein (e.g. for performing functionalities associated with the TMF).

TABLE 1

TMF Attributes

| TMF Attribute | Description |
|---|---|
| tmfEnable | May Enable/Disable TMF |
| accessRights | May include a List of local applications having access to the TMF and corresponding type of access of allowed |
| appTypeFilter | May create a TAP if the remote application is of a specified type |
| appIdFilter | May create a TAP if the remote application is matching a specified identifier/address |
| devTypeFilter | May create a TAP if the remote application is hosted on a device of a specified type |
| devIdFilter | May create a TAP if the remote application is hosted on a device matching a specified identifier/address |
| nwTypeFilter | May create a TAP if the remote application is hosted in a network of a specified type |
| nwIdFilter | May create a TAP if the remote application is hosted in a network matching a specified identifier/address |
| tapBufferingEnable | May Enable/Disable TAP buffering of incoming local application requests |
| tapCachingEnable | May Enable/Disable TAP caching of remote application responses |
| tapMirroringEnable | May Enable/Disable TAP mirroring of content included in tunneled requests/responses |
| tapConcatenationEnable | May Enable/Disable TAP concatenation of local application requests to remote application |
| tapRequestFilter | May be used by TAP to filter requests which may be sent to remote application |
| tmfStatus | Status of TMF (e.g. active or inactive) |
| expirationTime | Time after which the TMF may be deleted by the hosting ASL |
| creationTime | Time that the TMF may have been created |
| lastModifiedTime | Last time that the TMF may have been updated |
| announceTo | List of requested entities in local network that the TMF may be announced to. The hosting ASL of the TMF, may announce the TMF to these additional entities in the local network by creating an announced version of the TMF on these entities. An announced version of the TMF may include a link or reference to the TMF. Announcing the TMF promotes discovery of the TMF by applications. |

Figure 10:
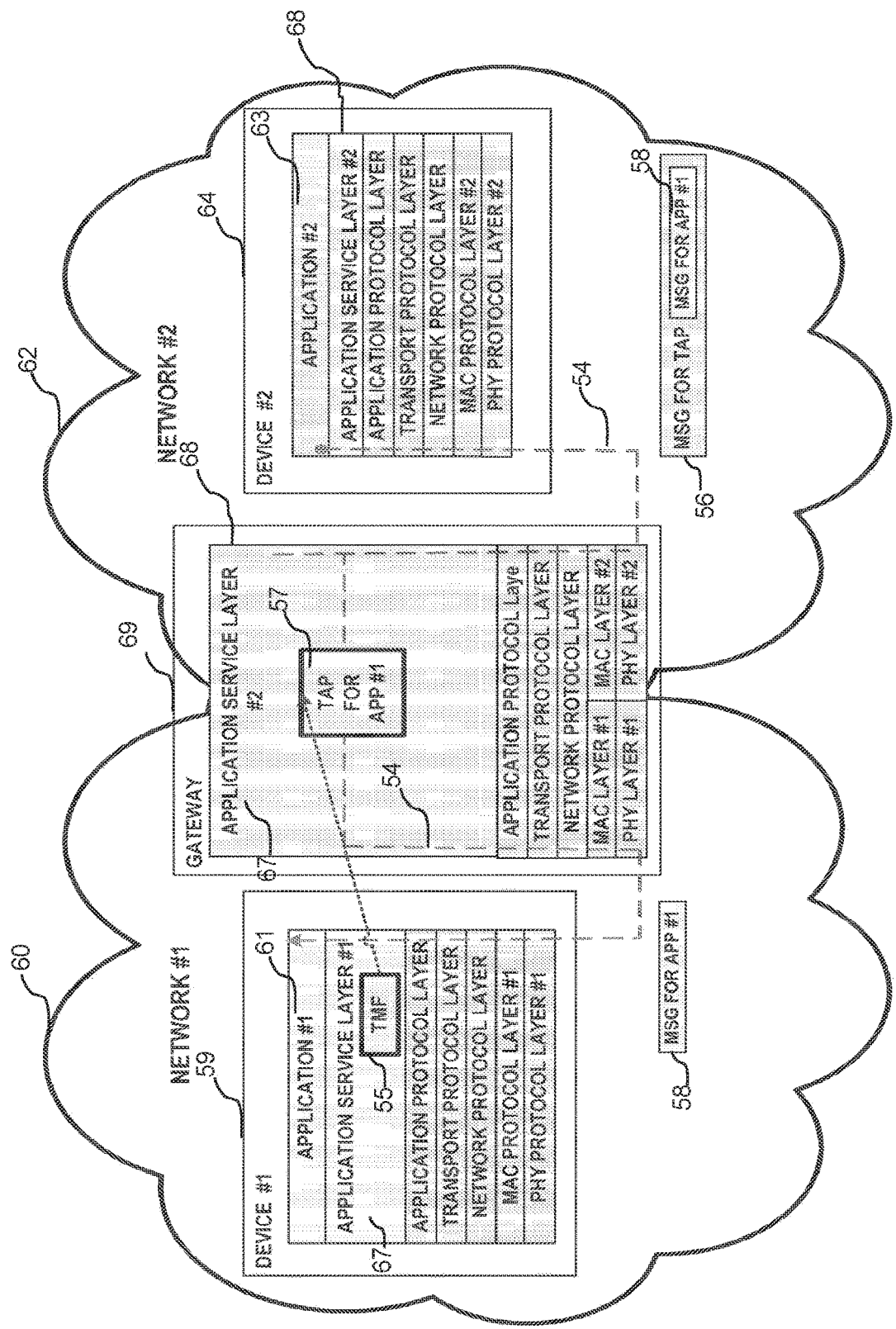
FIG. 10 is a block diagram illustrating an example of an intelligent ASL tunneling embodiment that may be provided and/or used herein.

In example embodiments (e.g. depending on the deployment scenario), the TMF (e.g. 55) described herein may be implemented as a centralized entity (e.g. hosted on a centralized gateway, as shown, for example, in FIG. 8) or as de-centralized entity (e.g. hosted on an individual device, as shown, for example, in FIG. 10).

The ASL Tunnel Anchor Point (TAP) (e.g. such as 57) may include one or more features and/or capabilities as described herein. For example, the TAP may include support for one or more forwarding addresses. The forwarding addresses may be configured, for example, by the TMF when establishing the TAP. The forwarding address(es) may be used by the TAP when forwarding requests that may be received from local applications that may target a remote application or resource and/or function of a remote resource.

The TAP may also include support for processing a tunneled request that may be received from a local application, de-encapsulating the request, and forwarding it to a remote application's forwarding address configured in the TAP. The TAP may further include maintaining state for remote application requests that may use or need responses. According to an embodiment, when a response may be received from a remote application, the response to the local application by tunneling it in a local ASL response message may be returned back to the local application that may have made the original request.

Additionally, the TAP may include support additional intelligent tunneling features. These intelligent features may be managed (e.g. enabled, disabled, configured, and the like) via attributes that may be supported by the TAP. Depending on the attribute, it may be controlled or queried by entities such as the TMF, the local ASL, or local applications. Some intelligent tunneling features and/or corresponding attributes may include one or more of the following: access control, buffering of requests, caching of responses, mirroring of content, concatenation of requests, filtering of requests, service discovery, supported protocol(s), supported content type(s), and the like.

According to an example embodiment, with respect to access control, the TAP may further enforce which local applications may use the TAP to communicate with the corresponding remote application. The access may be enforced using schemes such as checking a local application identifier against a list of approved applications. This access control list may be maintained as an attribute within the TAP.

Additionally, in an embodiment, the TAP may buffer requests from local applications targeting remote applications until the remote application may be ready to receive the requests. The buffering may be controlled by a TAP attribute. For example, the attribute may be enabled to buffer when a remote application may not be available (e.g. remote device that may be hosting application may be sleeping), may be disabled to stop buffering, and/or may be used to forward buffered messages to the remote application when the remote application may become available.

The TAP may also cache remote application responses and may use them to service subsequent accesses from local applications to the same remote application and/or resource. In an embodiment, caching may be enabled and/or disabled via a TAP attribute. Caching may also be enabled and/or disabled by the TAP itself by inspecting cache control fields supported within the protocol of the remote application response messages (e.g. if supported).

According to an example embodiment, the TAP may mirror the content that may be included in tunneled requests that may be issued by local applications or in response(s) from remote applications. Such content may be stored in an addressable resource within the TAP as the TAP processes the requests and/or responses that may flow through it. As such, the mirroring may be opportunistic in nature and may not use any additional overhead on the applications to create or maintain the mirrored content. Additionally, the mirrored content may discoverable and available by the TAP to local and remote applications. Applications may then access this content in a more efficient manner via the TAP serving as an intermediary.

The TAP may further concatenate multiple requests from local applications and may send them to the remote application using a single request (e.g. assuming the remote application supports concatenated requests). In an embodiment, concatenation may be controlled via configurable parameter in the TAP.

In an embodiment, the TAP may filter requests targeting a remote application. This filtering may be controlled via an attribute or attributes that may be supported by the TAP. For example, the TAP may support a configurable filter attribute that may be used to define the application resources and/or functions that may be accessible to local applications and those that may not. The filter attribute may be used by the TAP to qualify incoming requests from local applications to determine which ones may be allowed to be forwarded and which ones may not. Examples of intelligent types of filter criteria may include one or more of the following: a string or pattern to compare against the requested address; a type of request (e.g. reads but not writes); message length (e.g. greater than min length or less than max length); messages content type (e.g. XML); and the like.

The TAP may support a service type attribute or attributes to indicate what type of services the corresponding remote application associated with the TAP supports. For example, the attribute(s) may be configured by the TMF during the creation and setup of the TAP, and then may queried by the local applications to discover what type of services the remote application may support.

Additionally, the TAP may support a protocol type attribute(s) to indicate what type of protocol(s) the corresponding remote application associated with the TAP supports. The TAP may further support a content type attribute or attributes to indicate the type of content type(s) the corresponding remote application associated with the TAP may support.

Table 2 illustrates e a list of example TAP attributes that may be provided and/or used as described herein (e.g. for performing functionalities associated with the TAP).

TABLE 2

TAP Attributes

| TAP Attribute | Description |
| --- | --- |
| forwardingAddress | Forwarding address(s) of remote application/resources |
| accessRights | List of local applications having access to TAP and corresponding type of access of allowed |

TABLE 2-continued

TAP Attributes

| TAP Attribute | Description |
| --- | --- |
| bufferingEnable | Enables/Disables TAP buffering of incoming local application requests |
| cachingEnable | Enables/Disables TAP caching of remote application responses |
| mirroringEnable | Enables/Disables TAP mirroring of content from requests/responses |
| concatenationEnable | Enabled/Disables TAP concatenation of local application requests to remote application |
| requestFilter | Used by TAP to filter requests which are sent to remote application |
| serviceTypes | List of the type of service(s) supported by remote application |
| protocolTypes | List of the type of protocol(s) supported by remote application |
| contentTypes | List of the type of content type(s) supported by remote application |
| tapStatus | Status of corresponding remote application (e.g. online or offline) |
| expirationTime | Time after which the TAP will be deleted by the hosting ASL |
| creationTime | Time that the TAP was created |
| lastModifiedTime | Last time that the TAP was updated |
| announceTo | List of requested entities in local network that the TAP should be announced to. The hosting ASL of the TAP, announces the TAP to these additional entities in the local network by creating an announced version of the TAP on these entities. An announced version of the TAP contains a link or reference to the TAP. Announcing the TAP promotes discovery of the TAP by applications. |

Although some of the examples disclosed herein show one TAP being created per remote application by the TMF, additional TAPs may be setup with more granularity (e.g. one TAP per application resource) or less granularity (one TAP per device hosting multiple applications).

Inter-networking between an ETSI M2M and ZigBee IP SE 2.0 via ASL tunneling mechanism or component or ASL tunnel as described herein may be provided and/or used in an embodiment. For example, ASL tunneling may be a mechanism, technique, or method for inter-networking the ETSI M2M with other networking technologies such as ZigBee IP SE 2.0 (e.g. since both networking technologies may define RESTful resource based ASLs that may be ideal candidates for ASL tunneling). By creating a TAP for each ZigBee IP SE 2.0 device, application, and/or resource within the ETSI M2M resource structure, each ZigBee SE 2.0 device, application, and/or resource may be inter-networked with local applications residing in the ETSI M2M network.

Figure 11:
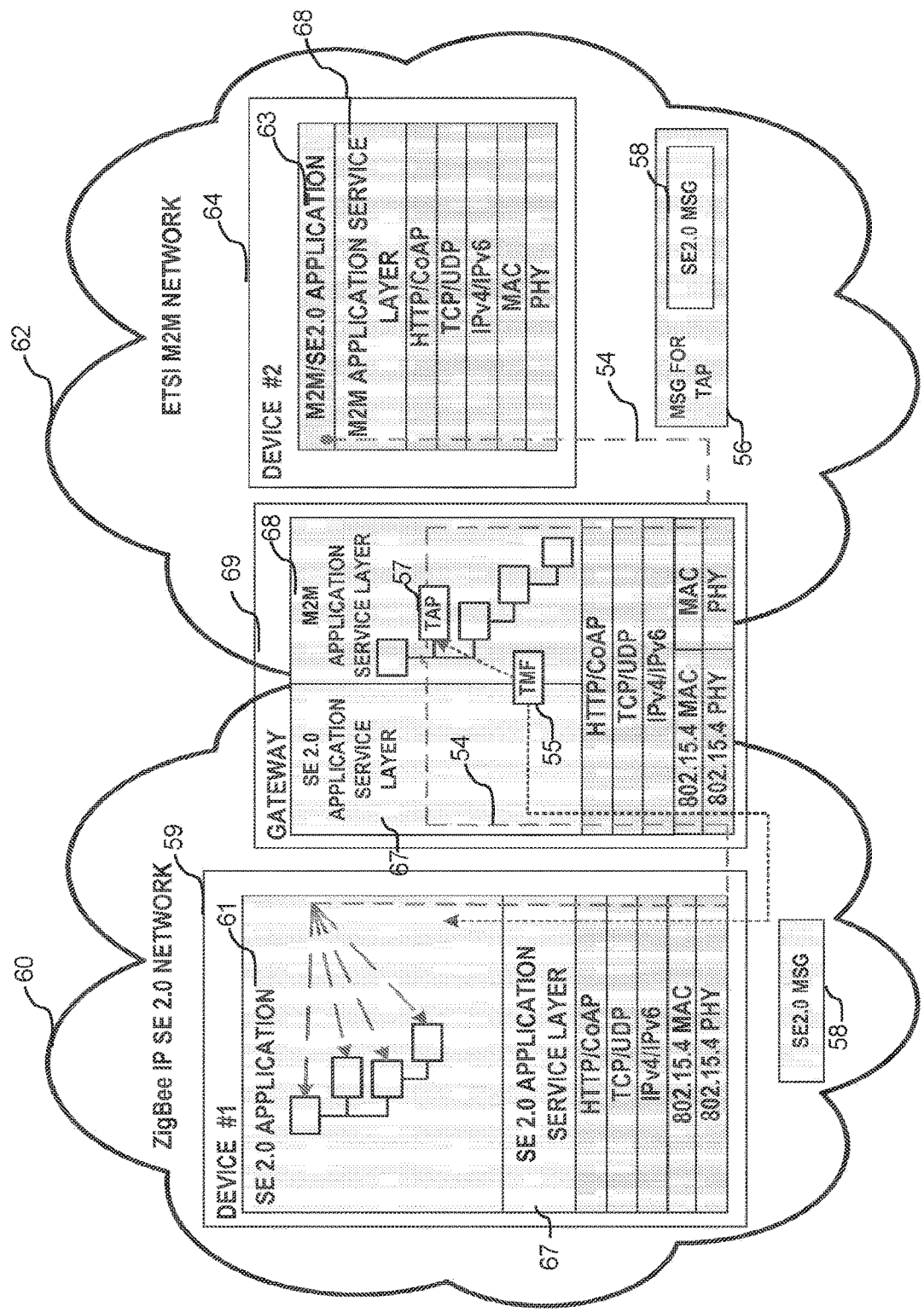
FIG. 11 is a block diagram illustrating an ETSI M2M network and a Zigbee IP SE 2.0 network, and ASL tunneling that may be used to inter-network their corresponding ASLs with one another.

FIG. 11 depicts a block diagram illustrating an example embodiment of an ETSI M2M network and a Zigbee IP SE 2.0 network that may use ASL tunneling to inter-network their corresponding ASLs with one another as described herein (e.g. similar to FIGS. 8 and 9A-9B). As shown in the embodiment in FIG. 11, the application (e.g. 63) that may reside in the ETSI M2M network (e.g. 62) and/or device associated therewith (e.g. 64) may initiate end-to-end communication with an application (e.g. 61) that may reside in the ZigBee IP SE 2.0 network (e.g. 60). The reverse may be carried out as well.

In an embodiment, such a communication may be enabled via an ASL tunnel (e.g. 54 that may be created by the ASL tunneling mechanism or component that may include TAP 57 and TMF 55) that may be setup by a TMF (e.g. 55). The TMF may create a TAP resource (e.g. 57) within the ETSI M2M ASL (SCL) (e.g. 68) that may be hosted on the gateway (e.g. 69) and may configure the TAP attributes to support communication between the ETSI M2M application (e.g. 63) and the SE 2.0 application (e.g. 61).

Figure 12:
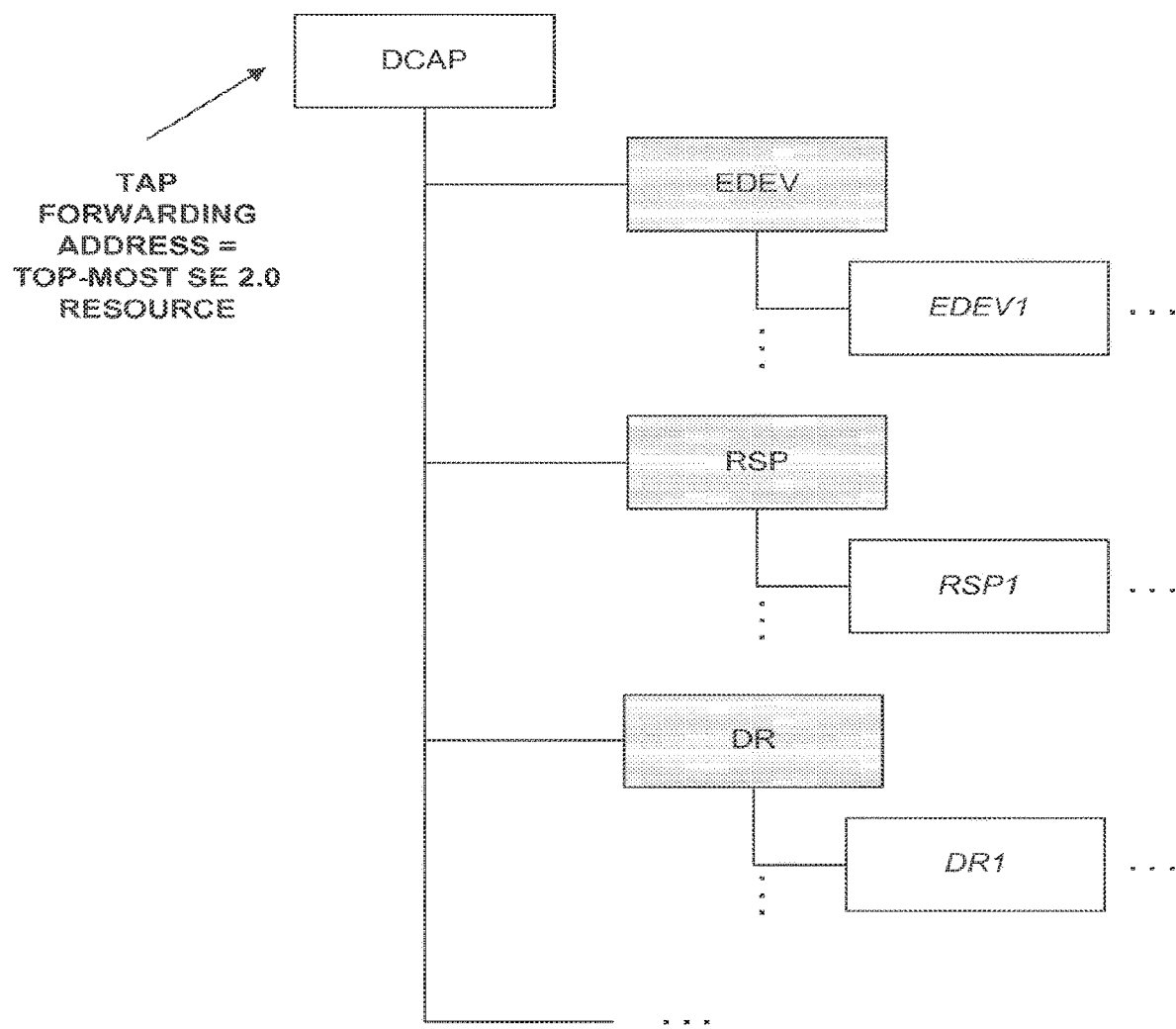
FIG. 12 is a block diagram illustrating example resource(s) of a tunneling anchor point (TAP) in accordance with one or more embodiments.
Figure 13:
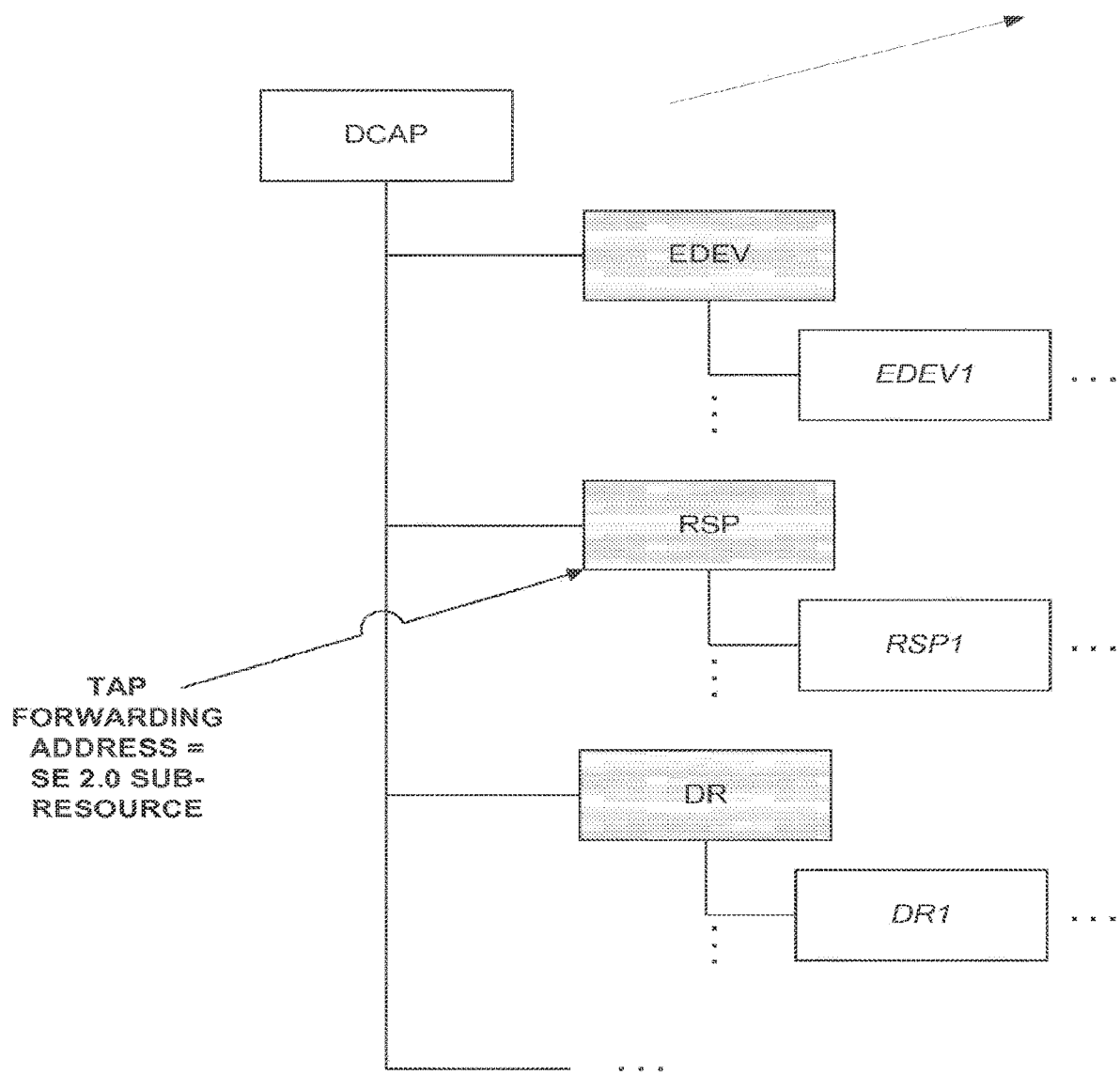
FIG. 13 is a block diagram illustrating example resource(s) of a tunneling anchor point in accordance with one or more embodiments.

When configuring the TAP attributes, the TMF (e.g. 55) may configure the forwarding address of the TAP to the top-most resource in the ZigBee SE 2.0 application resource structure as shown in FIG. 12 to inter-network the SE 2.0 application resources and to enable or allow them to be discoverable and accessible to the ETSI M2M applications (e.g. 63). Alternatively, separate individual TAPs may be created for each SE 2.0 application resource (e.g. if desired). Additionally, the TMF (e.g. 55) may configure the forwarding address of the TAP to a sub-resource in the in the ZigBee SE 2.0 application resource structure as shown FIG. 13 to inter-network a subset of the SE 2.0 application resources and to enable or allow a subset to be discoverable and accessible to the ETSI M2M applications (e.g. 63).

Figure 14:
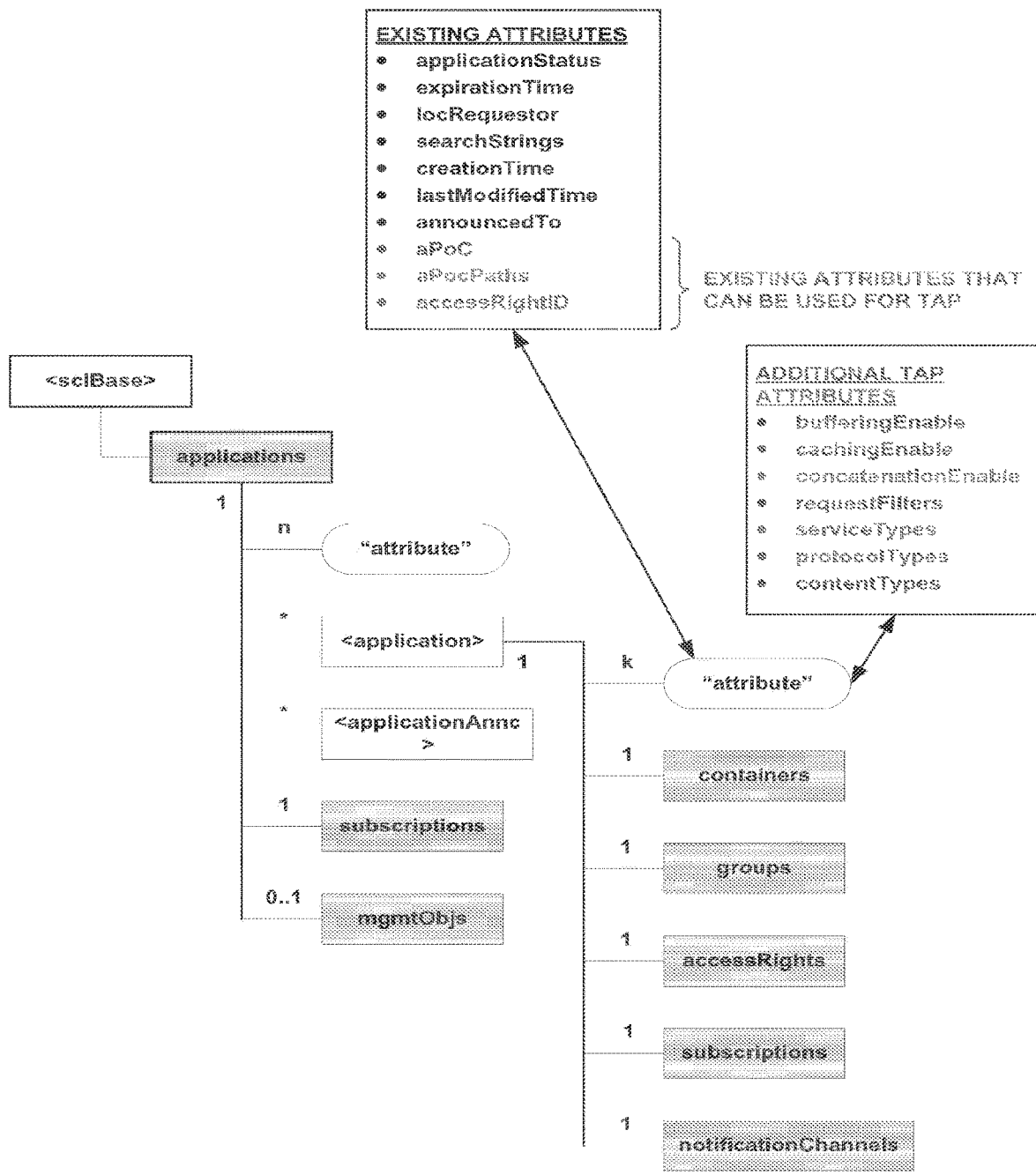
FIG. 14 shows an ETSI M2M <application> resource that may be leveraged and/or enhanced with additional attributes and corresponding functionality to support the intelligent TAP features.
Figure 15:
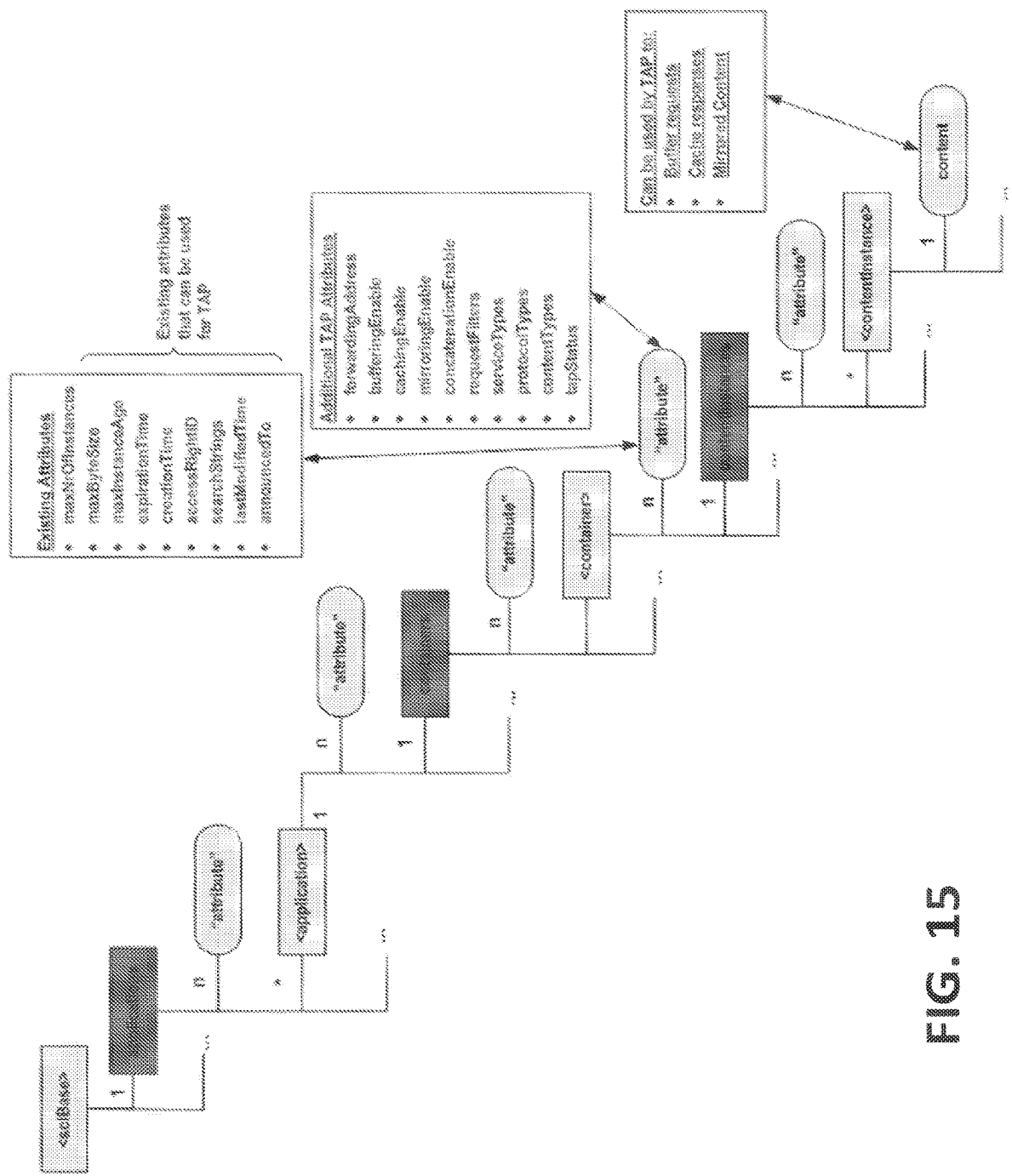
FIG. 15 shows an example embodiment of how an ETSI M2M <container> resource may be leveraged and enhanced with additional attributes and corresponding functionality to support the intelligent TAP features.

According to an example embodiment, the TAP (e.g. 57) may be supported within the ETSI M2M resource structure by using one of the existing resources defined in the targeted first release of the ETSI M2M standard, and adding additional attributes and functionality to the resource to support the intelligent TAP features (including those described above). Some resource types that may be provided and/or used may include, but are not limited to, the ETSI M2M application resource or the container resource. For example, FIG. 14 shows the ETSI M2M <application> resource that may be leveraged and/or enhanced with additional attributes and corresponding functionality to support the intelligent TAP features (including those described above). Additionally, FIG. 15 shows how the ETSI M2M <container> resource may be leveraged and/or enhanced with additional attributes and corresponding functionality to support the intelligent TAP features disclosed herein.

Figure 16:
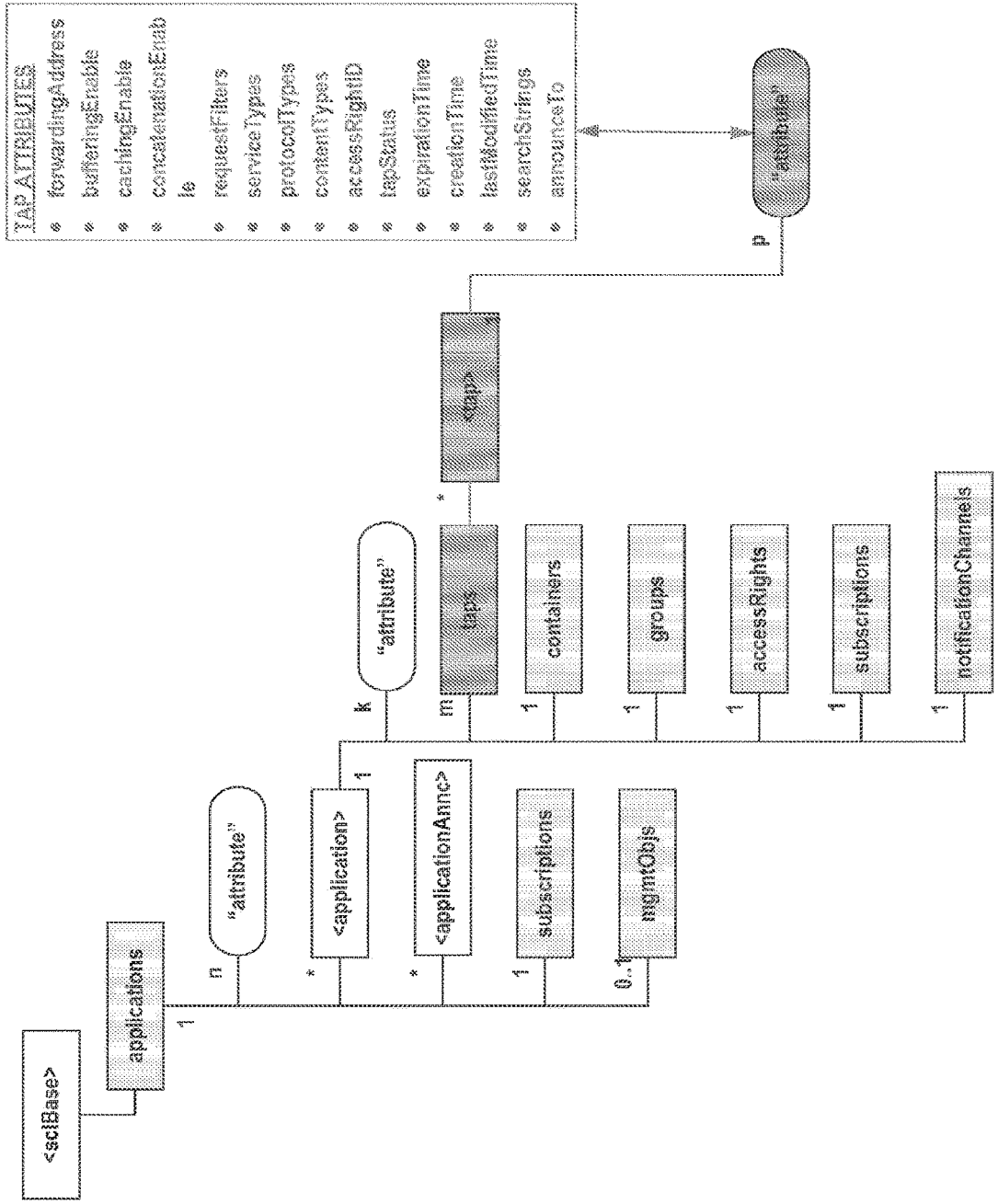
FIG. 16 shows an ETSI M2M resource having attributes and corresponding functionality to support the intelligent TAP features.

In an embodiment, a new dedicated resource type may also be defined in the ETSI M2M resource structure specifically targeted for supporting inter-networking of the ETSI M2M ASL (SCL) (e.g. 68) with the ASLs of other networking technologies. A logical place for this new TAP resource to reside in the ETSI M2M resource structure may be a sub-resource under the application resource as shown in FIG. 16.

Additionally, the TMF (e.g. 55) may be defined as a new function in the ETSI M2M ASL (SCL) (e.g. 68). Example TMF features and/or capabilities for such embodiments may include performing discovery to locate its local ETSI M2M ASL (SCL) and/or registering to it as a TMF. In such an embodiment (e.g. by doing so), the TMF (e.g. 55) may create a resource in the ETSI M2M ASL (SCL) (e.g. 68). The TMF (e.g. 55) may use a 'ETSI M2M SCL and SP Discovery' procedure or method or any other suitable discover procedure or method. Alternatively, the TMF (e.g. 55) may be pre-provisioned with discovery information for local M2M SCL.

The TMF (e.g. 55) may also support a configurable set of attributes (e.g. as set forth above) to enable allow entities such as ETSI M2M ASL (SCL) (e.g. 68) and applications to configure and control TMF. These attributes may be accessed by the ETSI M2M ASL (e.g. 68) as well as local applications to interface to the TMF (e.g. 55).

The TMF (e.g. 55) may further perform periodic discovery to detect active non-ETSI M2M devices and applications in networks (e.g. 60) that may be inter-connected to a ETSI M2M network. The TMF (e.g. 55) may use a discovery mechanism that may be natively supported (e.g. if one exists) by the network inter-connected to the ETSI M2M network (e.g. 62). Alternatively, the TMF (e.g. 55) may be pre-provisioned with discovery information for each available non-ETSI M2M Application (e.g. 63).

Additionally, in an embodiment, the TMF (e.g. 55) may create corresponding TAP resources in the ETSI M2M ASL (SCL) (e.g. 68) for each newly discovered non-ETSI M2M application (e.g. 61). The TMF (e.g. 55) may configure TAP attributes for each non-ETSI M2M application based on, for example, information the TMF discovers about the non-ETSI M2M application, and/or information configured by the ETSI M2M ASL (SCL) (e.g. 68) and applications within the TMF via the TMF's configurable attributes.

The TMF (e.g. 55) may request, on behalf of each non-ETSI M2M application (e.g. 61), the local M2M ASL (SCL) announce the TAPs to other remote ETSI M2M ASLs (SCLs) in the network so these TAPs (e.g. 57) may be discovered by ETSI M2M applications.

The TMF (e.g. 55) may also detect when non-ETSI M2M applications may not be longer active (e.g. a device hosting application may leave the network), and may delete TAP resources from the local ETSI M2M ASL (SCL) (e.g. 68).

Similar to the TAP (e.g. 57), the TMF resource may be supported within the ETSI M2M resource structure by using one of the existing resources that may be defined in the targeted first release of the ETSI M2M standard and adding additional attributes and functionality to the resource to support the intelligent TMF features (e.g., as defined above). Example resource types may include the ETSI M2M application resource or the container resource.

Figure 17:
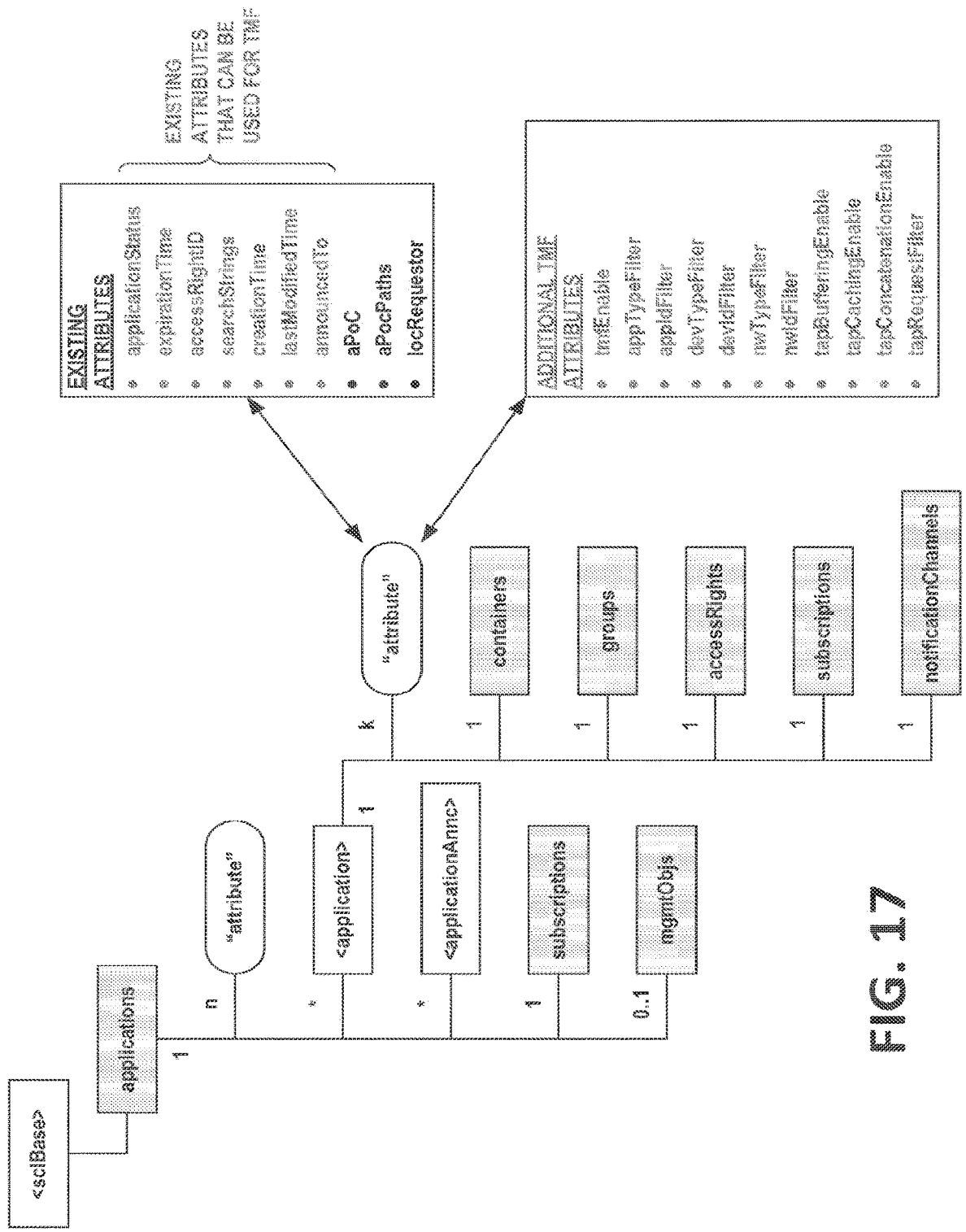
FIG. 17 is a block diagram illustrating the ETSI M2M <application> resource that may be leveraged and/or enhanced with additional attributes and corresponding functionality to support ASL Tunnel Management Function features.
Figure 18:
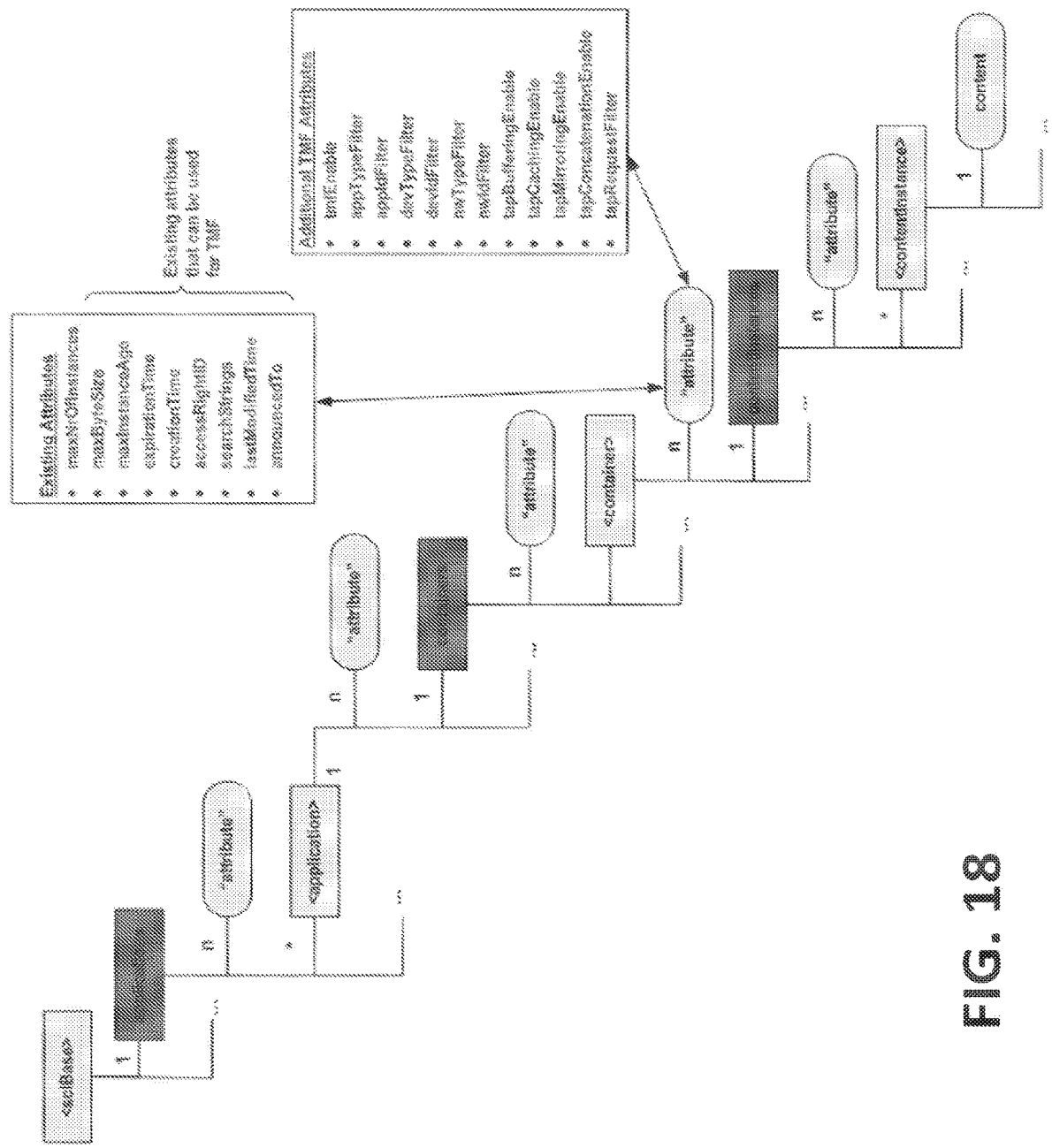
FIG. 18 shows how an ETSI M2M <container> resource may be leveraged and enhanced with additional attributes and corresponding functionality to support the TMF features.

FIG. 17 depicts a block diagram illustrating the ETSI M2M <application> resource that may be leveraged and/or enhanced with additional attributes and corresponding functionality to support the TMF features described herein. For example, FIG. 18 shows how the ETSI M2M <container> resource may be leveraged and enhanced with additional attributes and corresponding functionality to support the TMF features as described herein.

Figure 19:
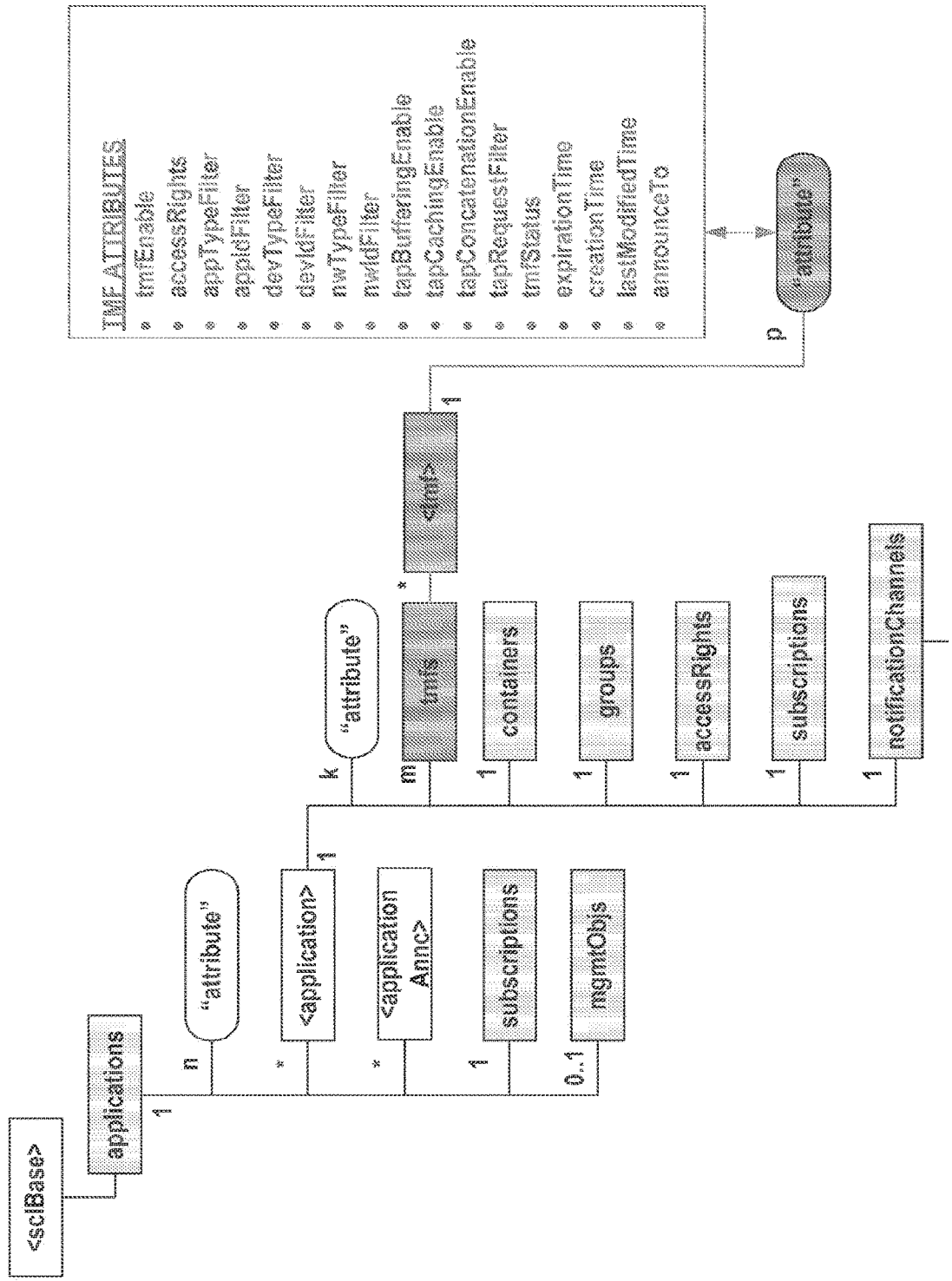
FIG. 19 shows an ETSI M2M resource having attributes and corresponding functionality to support the ASL Tunnel Management Function features.

Alternatively, a new dedicated resource type can be defined in the ETSI M2M resource structure specifically targeted for supporting inter-networking of the ETSI M2M ASL (SCL) (e.g. 68) with the ASLs of other networking technologies. A logical place for this new TMF resource to reside in the ETSI M2M resource structure would be a sub-resource under the application resource as shown in FIG. 19.

Figure 20A:
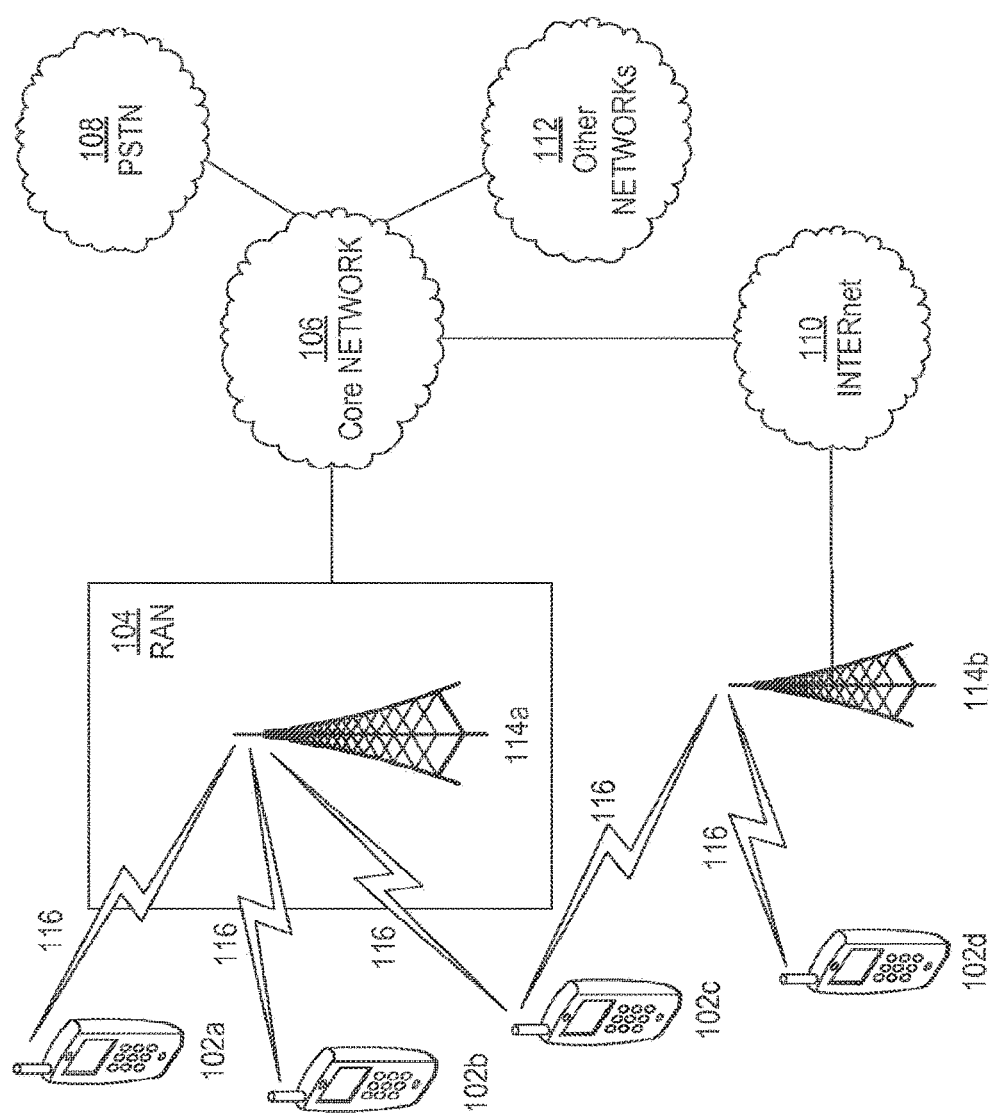
FIG. 20A is a diagram of an example communications system in which one or more disclosed embodiments may be implemented.

FIG. 20A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 20A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 20A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 20A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 20A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 20A may be configured to communicate with the base station 114a, which may employ a cellular-based radio technology, and with the base station 114b, which may employ an IEEE 802 radio technology.

Figure 20B:
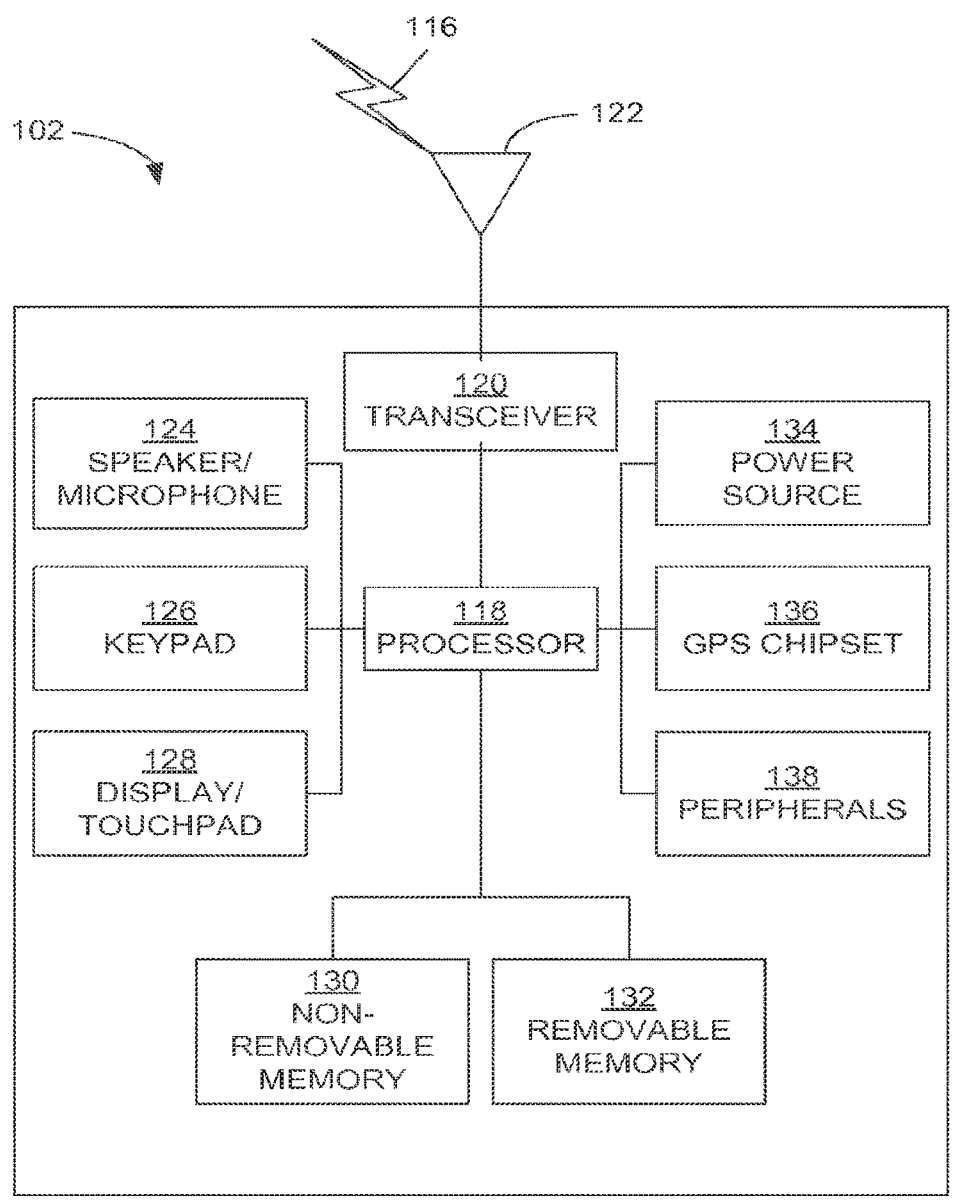
FIG. 20B is a system diagram of an example wireless transmit/receive unit (WTRU) that may be used within the communications system illustrated in FIG. 20A.

FIG. 20B is a system diagram of an example WTRU 102. As shown in FIG. 20B, the WTRU 102 may include a processor 118, a transceiver 120, a transmit/receive element 122, a speaker/microphone 124, a keypad 126, a display/touchpad 128, non-removable memory 19, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 20B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 20B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 19 and/or the removable memory 132. The non-removable memory 19 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 20C:
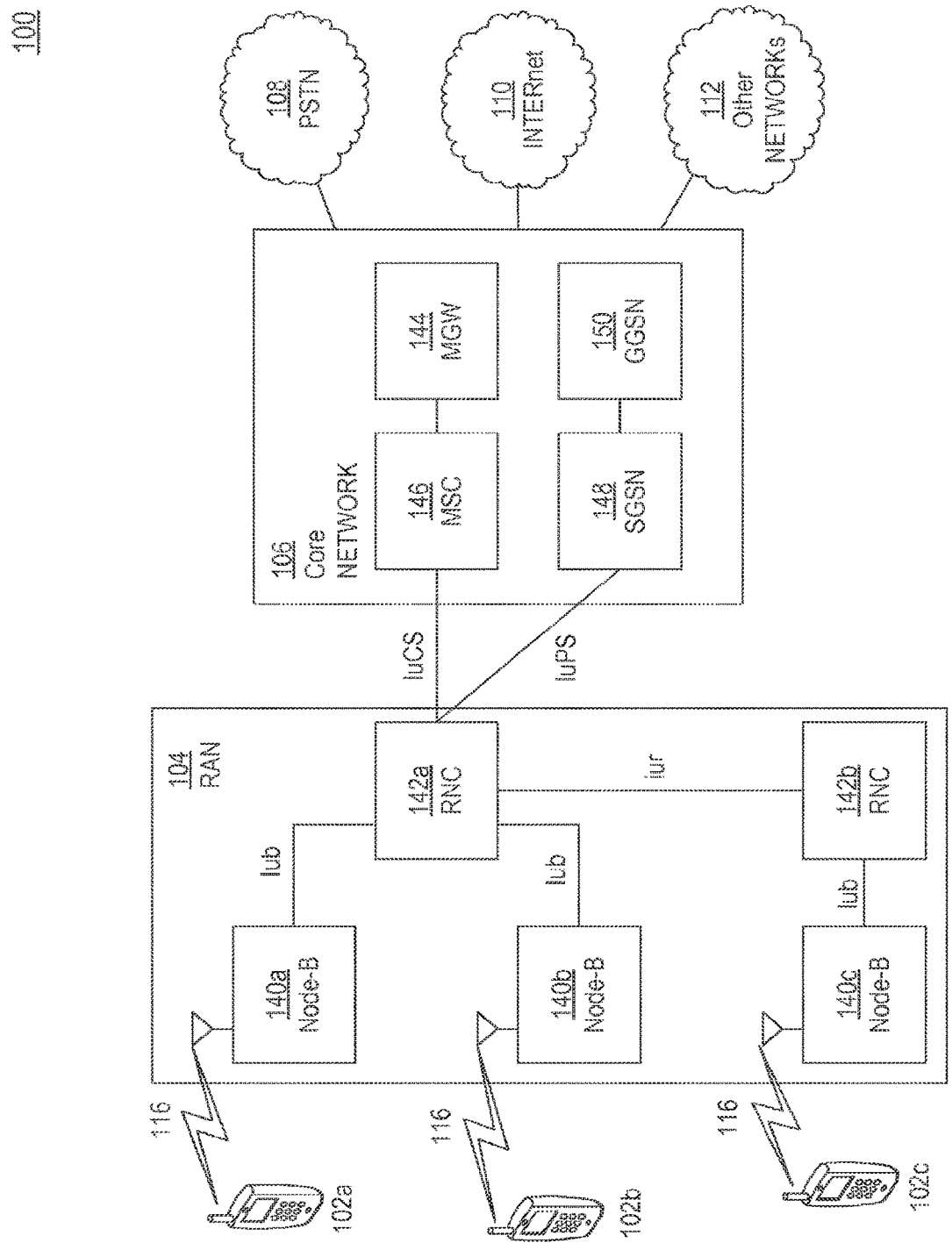
FIG. 20C is a system diagram of an example radio access network and an example core network that may be used within the communications system illustrated in FIG. 20A.

FIG. 20C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 20C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 20C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 20C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 20D:
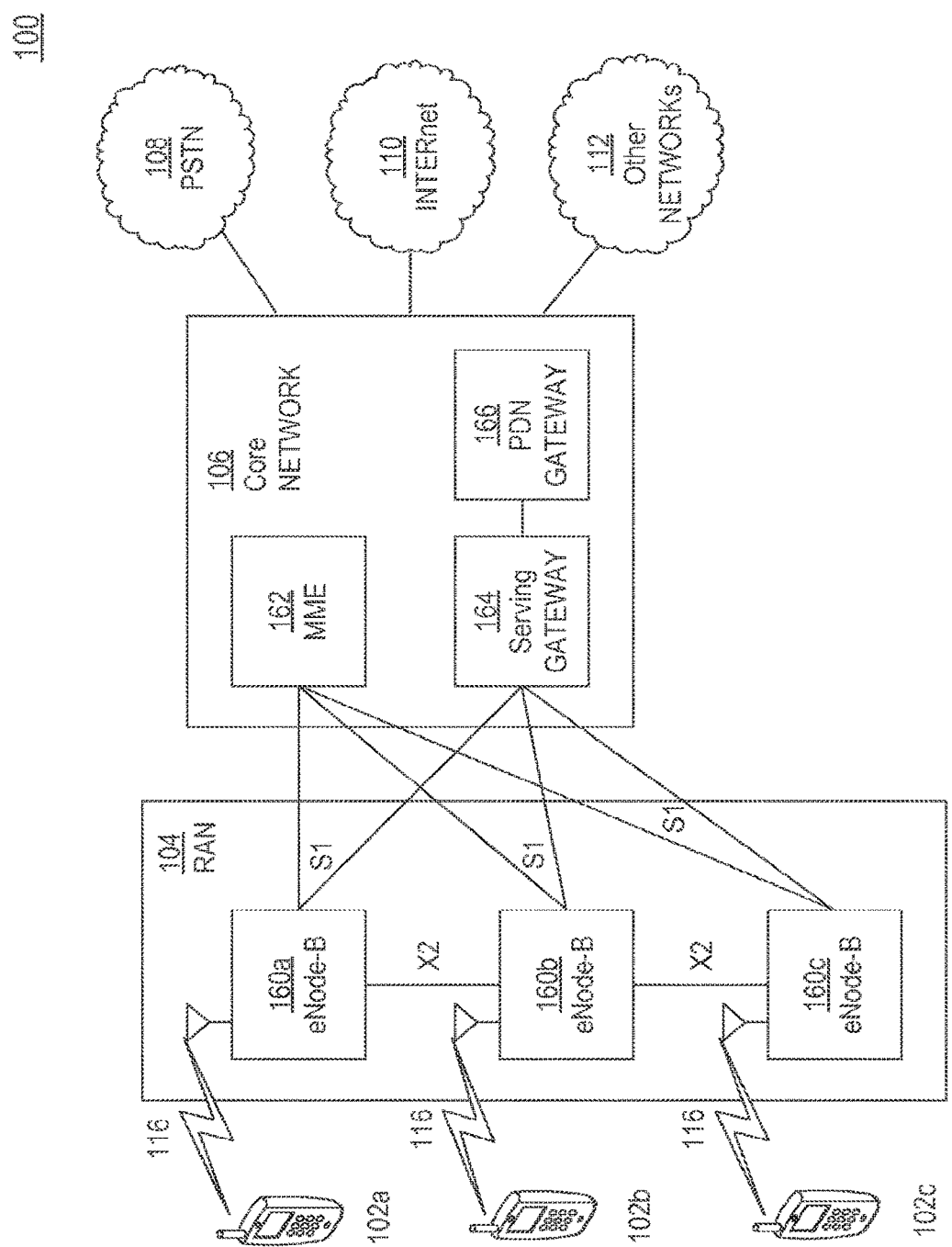
FIG. 20D is a system diagram of another example radio access network and an example core network that may be used within the communications system illustrated in FIG. 20A.

FIG. 20D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 20D, the eNode-Bs 140a, 140b, 140c may communicate with one another over an X2 interface.

The core network 106 shown in FIG. 20D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 20E:
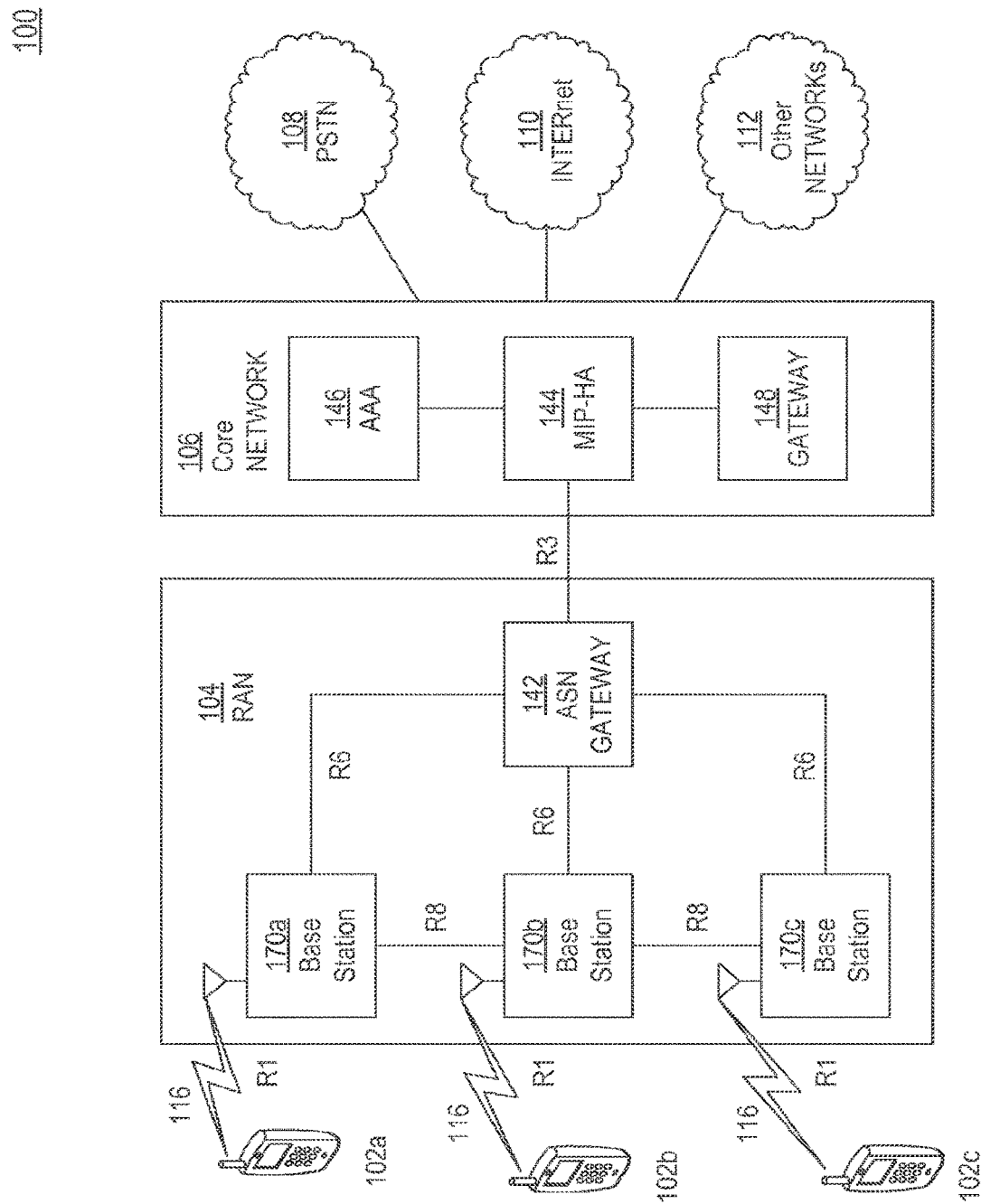
FIG. 20E is a system diagram of another example radio access network and an example core network that may be used within the communications system illustrated in FIG. 20A.

FIG. 20E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 20E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 20E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 20E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

The invention claimed is:

1. A method for machine-to-machine (M2M) communications comprising:
    receiving, by a first node, resource configuration information for a resource from a second node;
    determining, by the first node, that the second node has access privileges for the resource;
    configuring, by the first node, an attribute of the resource based on the resource configuration information on a condition that the second node has a right to update the resource configuration information for the resource;
    receiving, by the first node, an M2M request for the resource from a third node;
    determining, by the first node, that a retarget request of the M2M request for the resource is required based on the resource configuration information;
    sending, by the first node, the retarget request to at least one retargeted node;
    receiving, by the first node, a response from the at least one retargeted node;
    configuring, by the first node, attributes from the response from the at least one retargeted node based on the resource configuration information; and
    sending, by the first node, a response to the third node.

2. The method of claim 1, wherein the resource configuration information is a request to create or update a resource.

3. The method of claim 1, wherein the at least one retargeted node is the second node.

4. The method of claim 1 further comprising determining, by the first node, the at least one retargeted node to send the retarget request.

5. The method of claim 4, wherein the at least one retargeted node is a plurality of retargeted nodes.

6. A first node configured for machine-to-machine (M2M) communications, the first node comprising:
a receiver;
a transmitter; and
a processor, wherein:
the receiver is configured to receive resource configuration information for a resource from a second node;
the processor is configured to determine that the second node has access privileges for the resource;
the processor is further configured to configure an attribute of the resource based on the resource configuration information on a condition that the second node has a right to update the resource configuration information for the resource;
the receiver is further configured to receive an M2M request for the resource from a third node;
the processor is further configured to determine that a retarget request of the M2M request for the resource is required based on the resource configuration information;
the transmitter is configured to send the retarget request to at least one retargeted node;
the receiver is further configured to receive a response from the at least one retargeted node;
the processor is further configured to configure attributes from the response from the at least one retargeted node based on the resource configuration information; and
the transmitter is further configured to send a response to the third node.

7. The first node of claim 6, wherein the resource configuration information is a request to create or update a resource.

8. The first node of claim 6, wherein the at least one retargeted node is the second node.

9. The first node of claim 6 wherein the processor is further configured to determine the at least one retargeted node to send the retarget request.

10. The first node of claim 9, wherein the at least one retargeted node is a plurality of retargeted nodes.

* * * * *